March 22, 1966  C. M. HAMMACK  3,242,487
DETECTION AND TRACKING OF MULTIPLE TARGETS
Filed Dec. 5, 1963  11 Sheets-Sheet 1
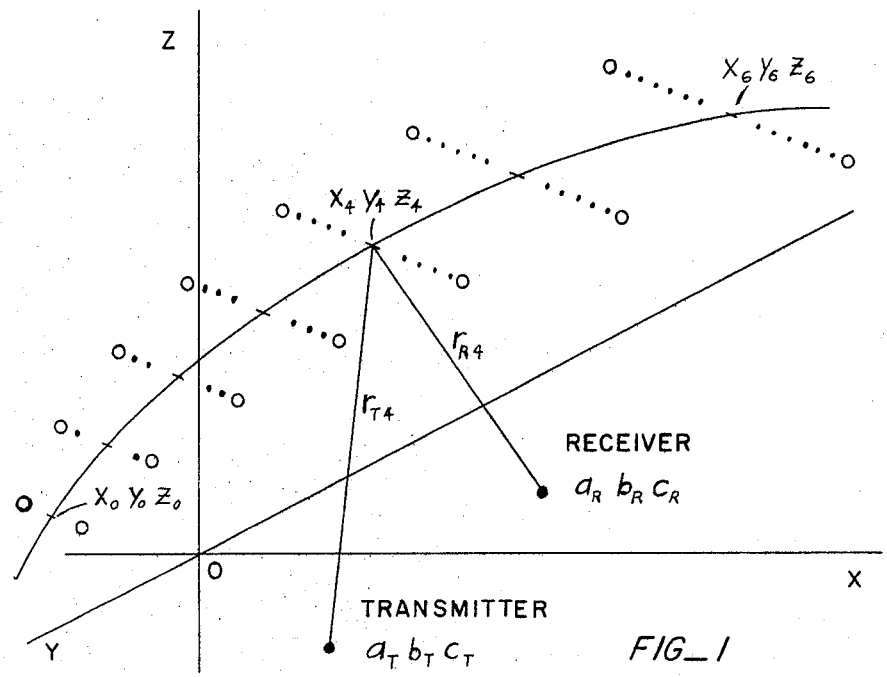
FIG_1
INVENTOR.
CALVIN M. HAMMACK
BY
Allen and Cerony

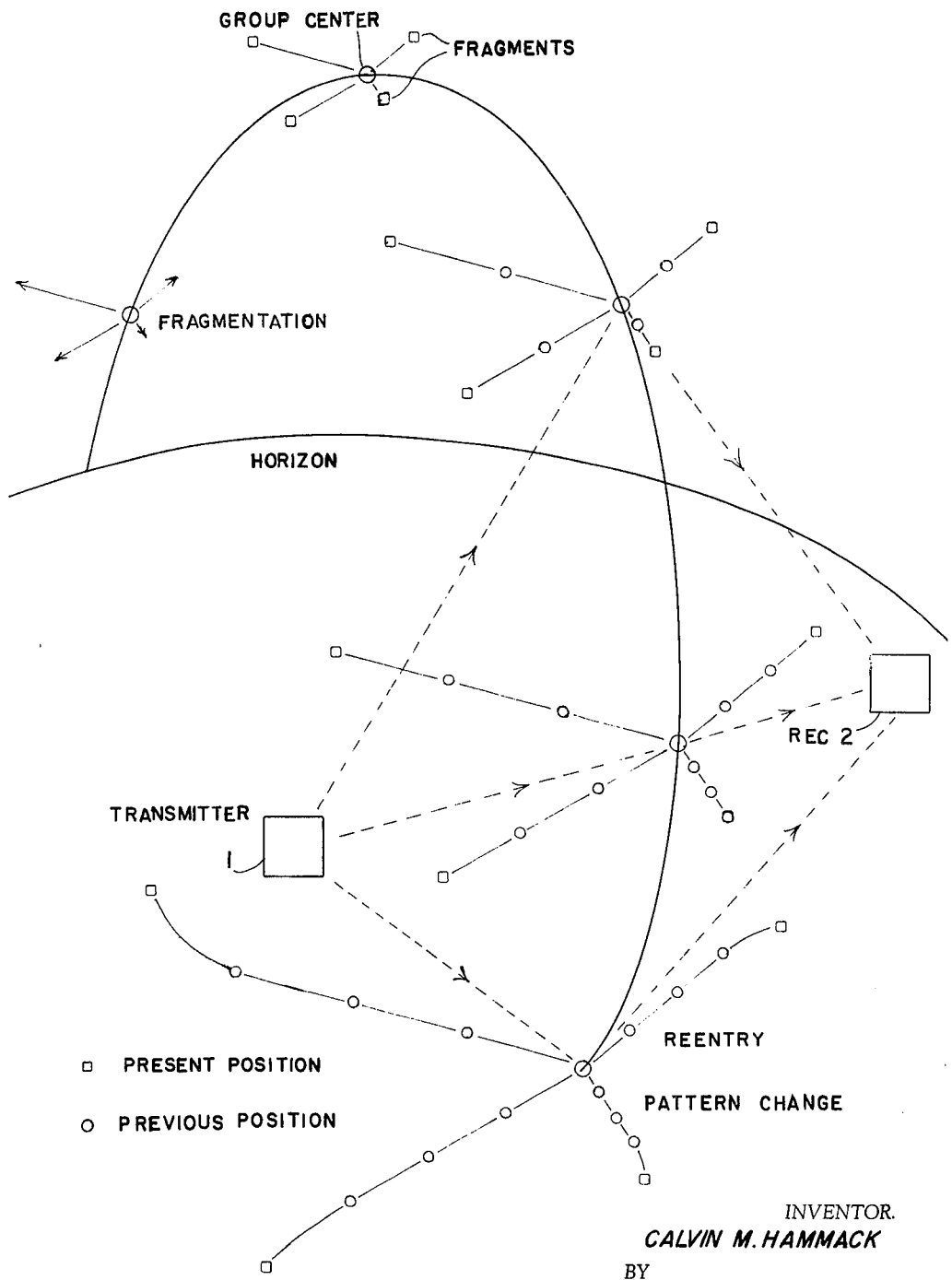
FIG_2

March 22, 1966 C. M. HAMMACK 3,242,487
DETECTION AND TRACKING OF MULTIPLE TARGETS
Filed Dec. 5, 1963 11 Sheets-Sheet 3
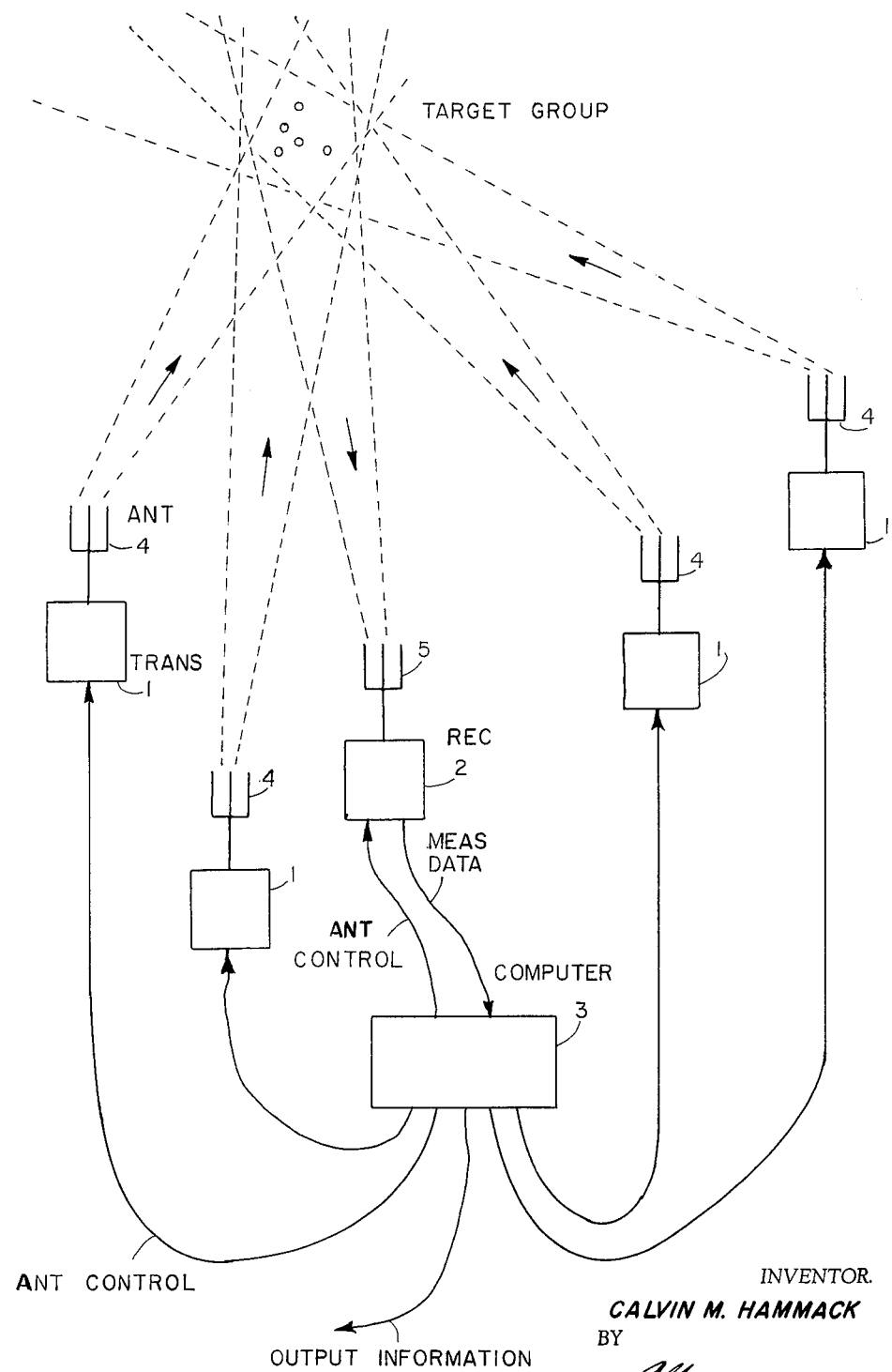
FIG_3
INVENTOR.
CALVIN M. HAMMACK

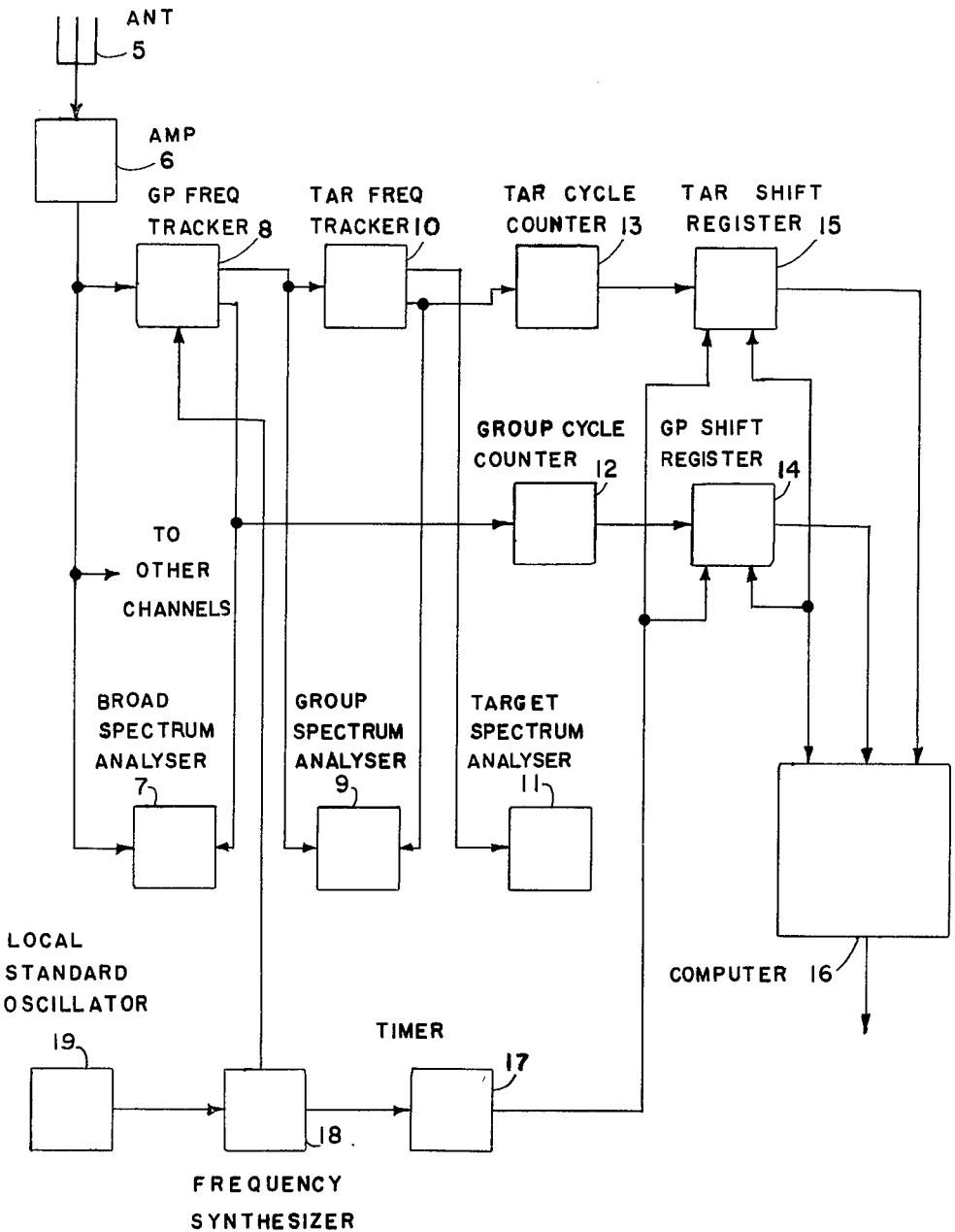
FIG_4

March 22, 1966     C. M. HAMMACK     3,242,487
DETECTION AND TRACKING OF MULTIPLE TARGETS
Filed Dec. 5, 1963     11 Sheets-Sheet 5
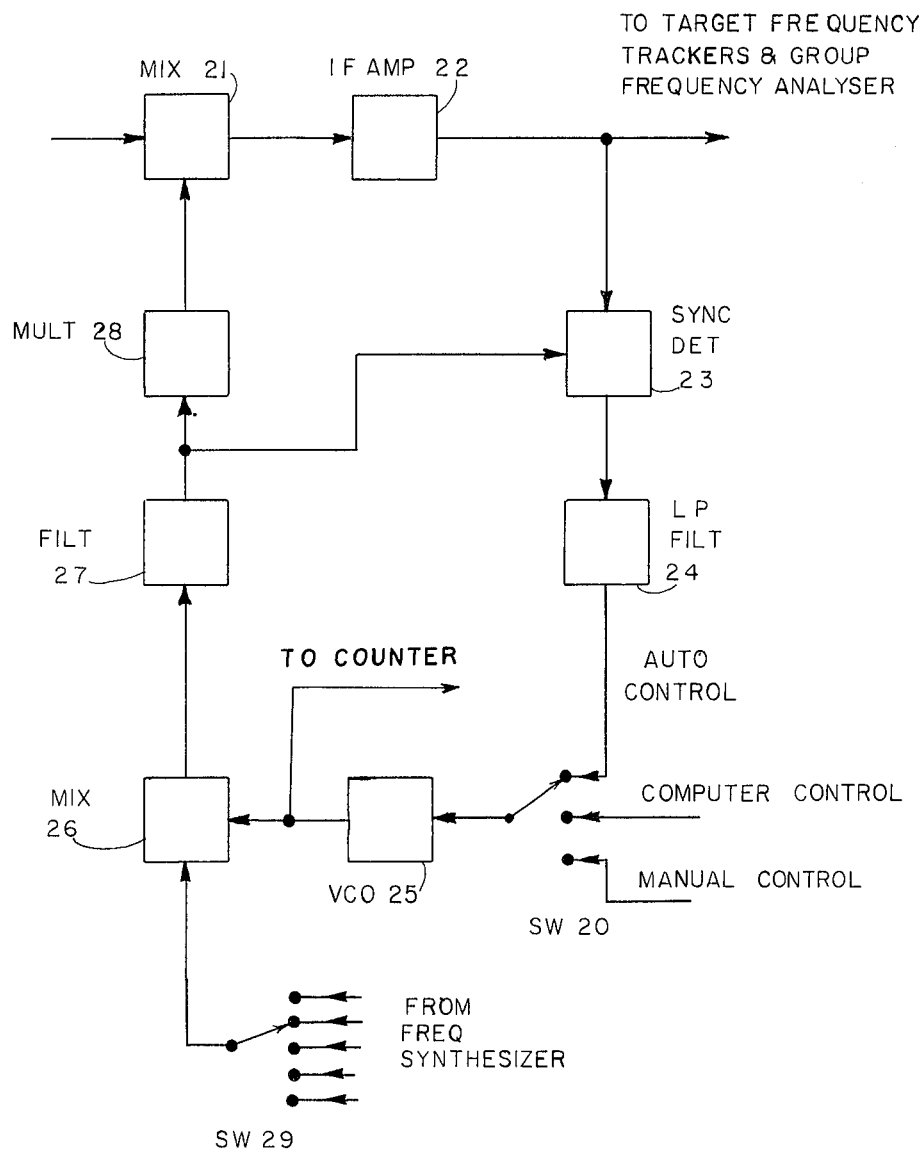
FIG_5
INVENTOR.
CALVIN M. HAMMACK
BY
Allen and Chromy

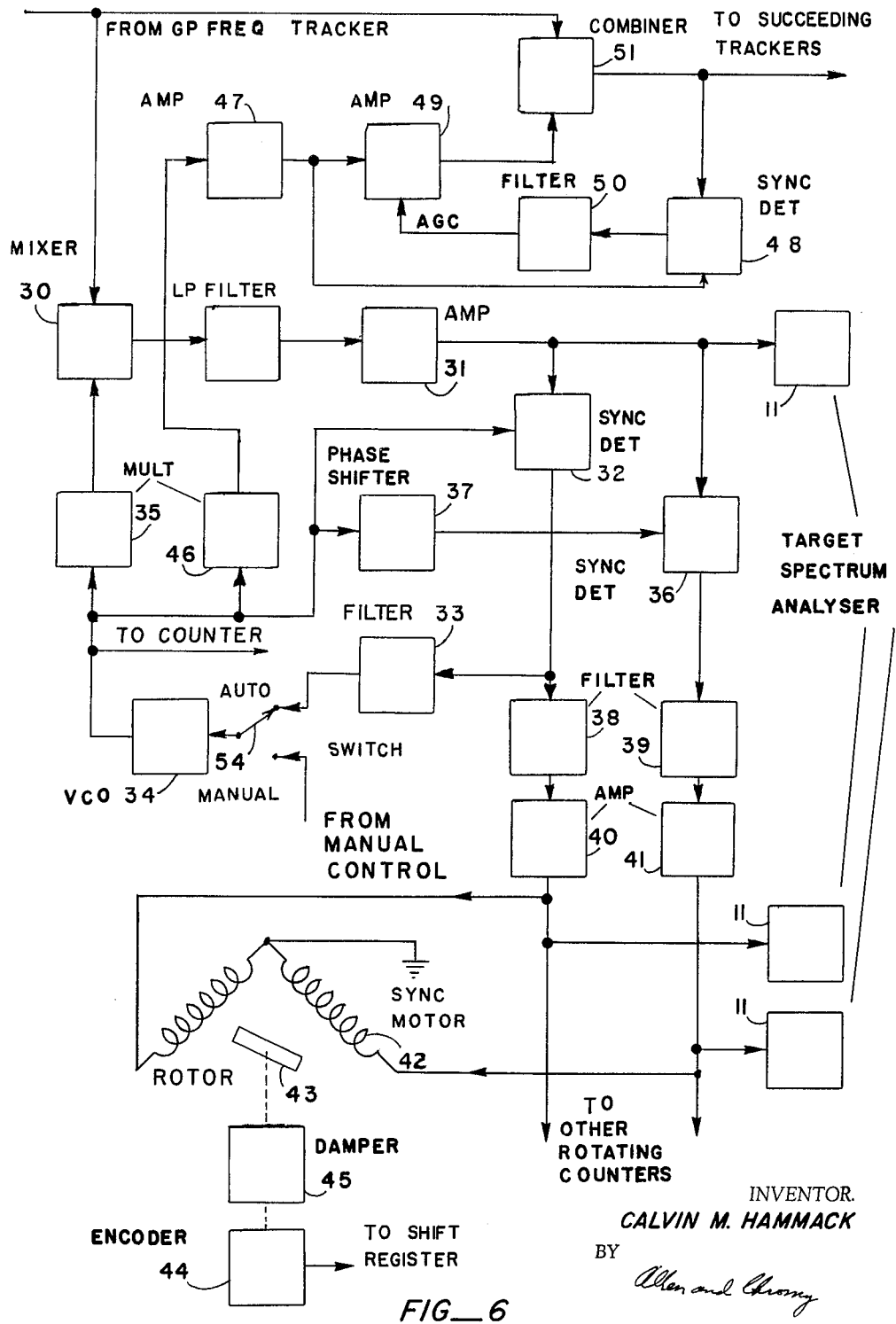
FIG_6

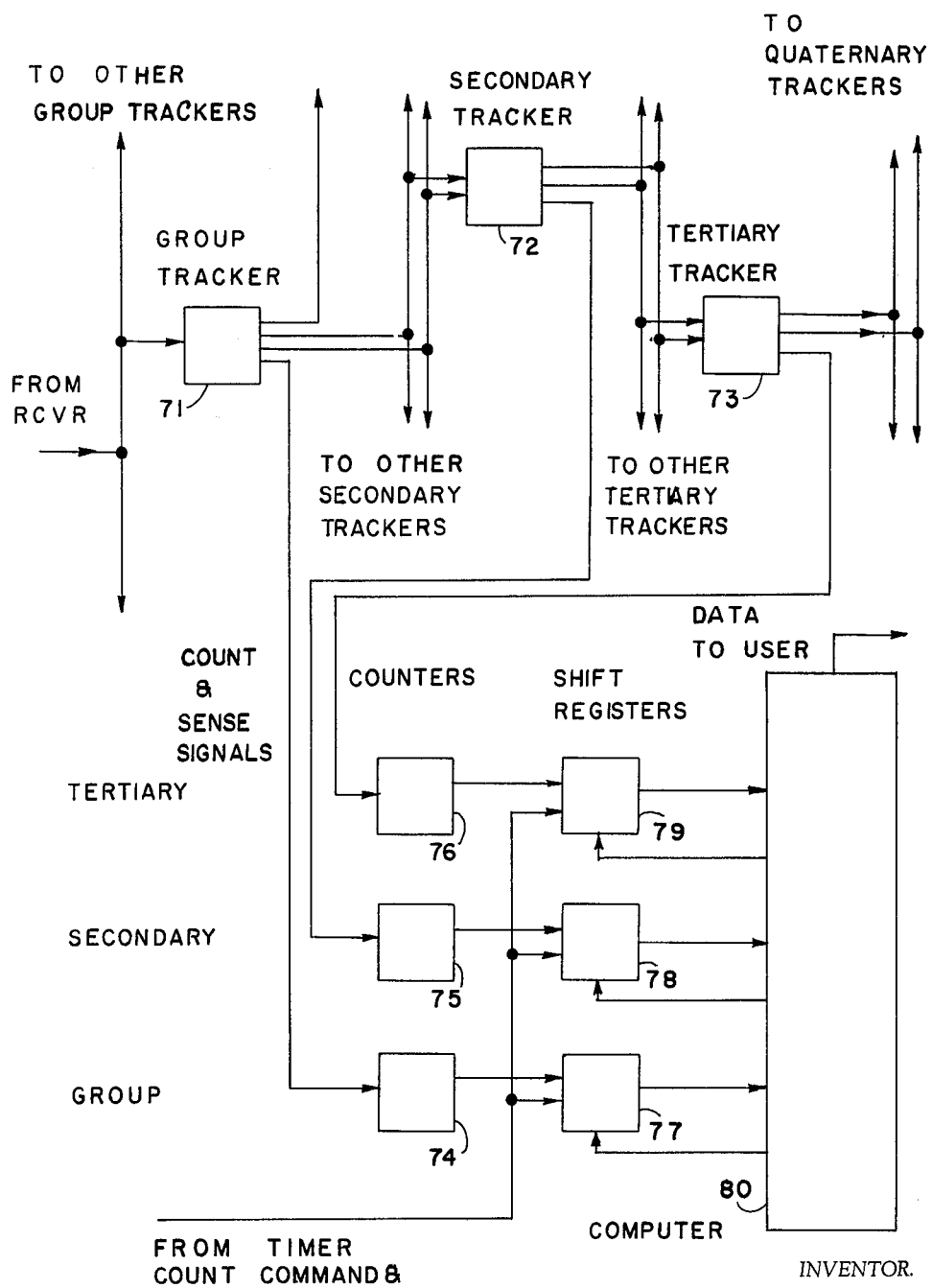
FIG_7

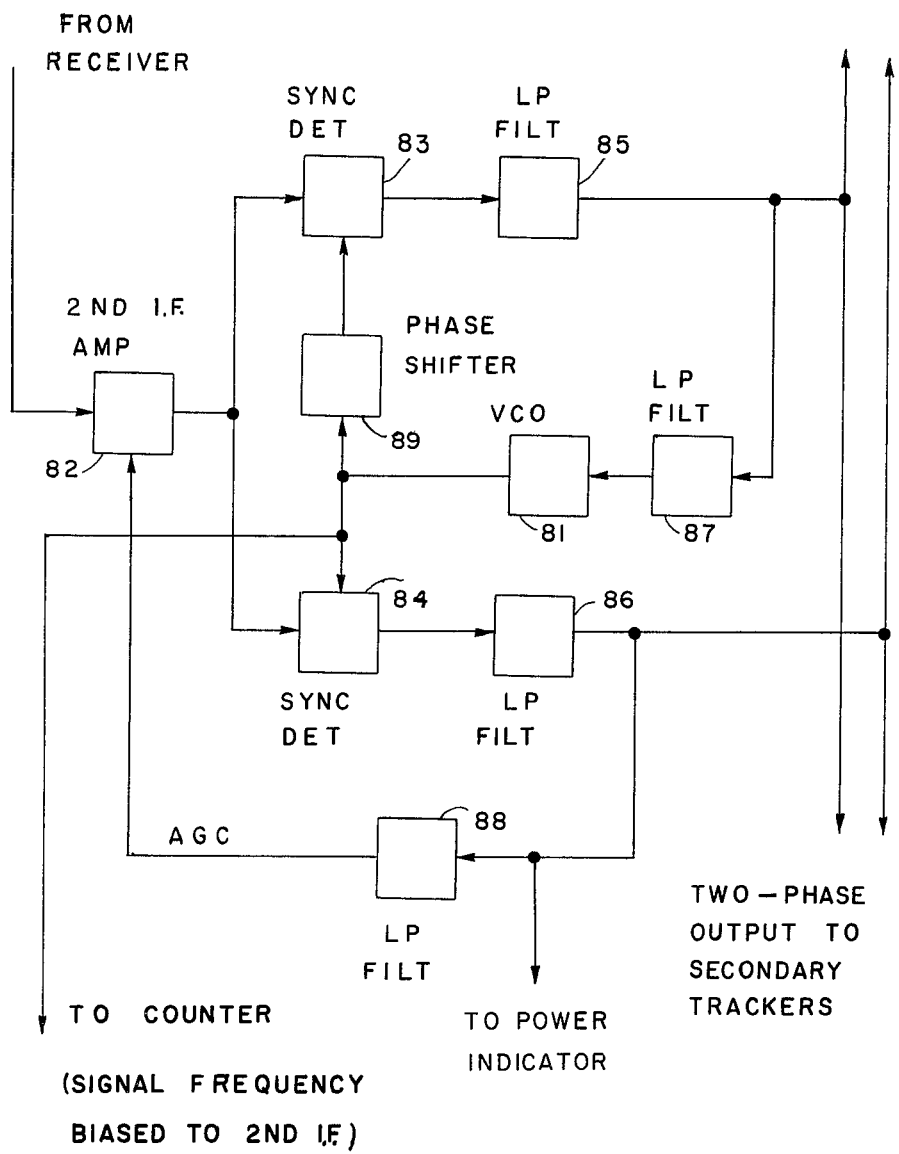
FIG_8

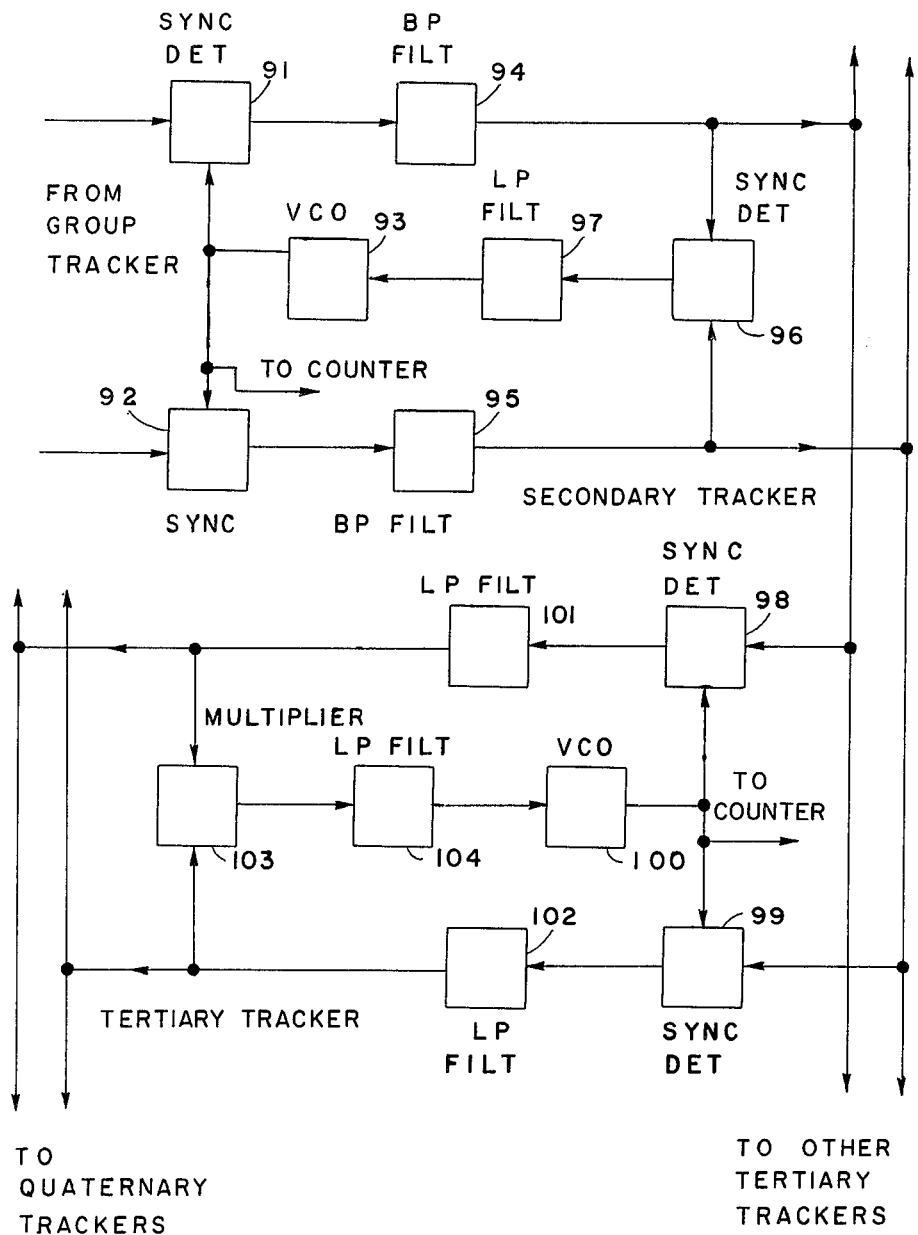
FIG_9

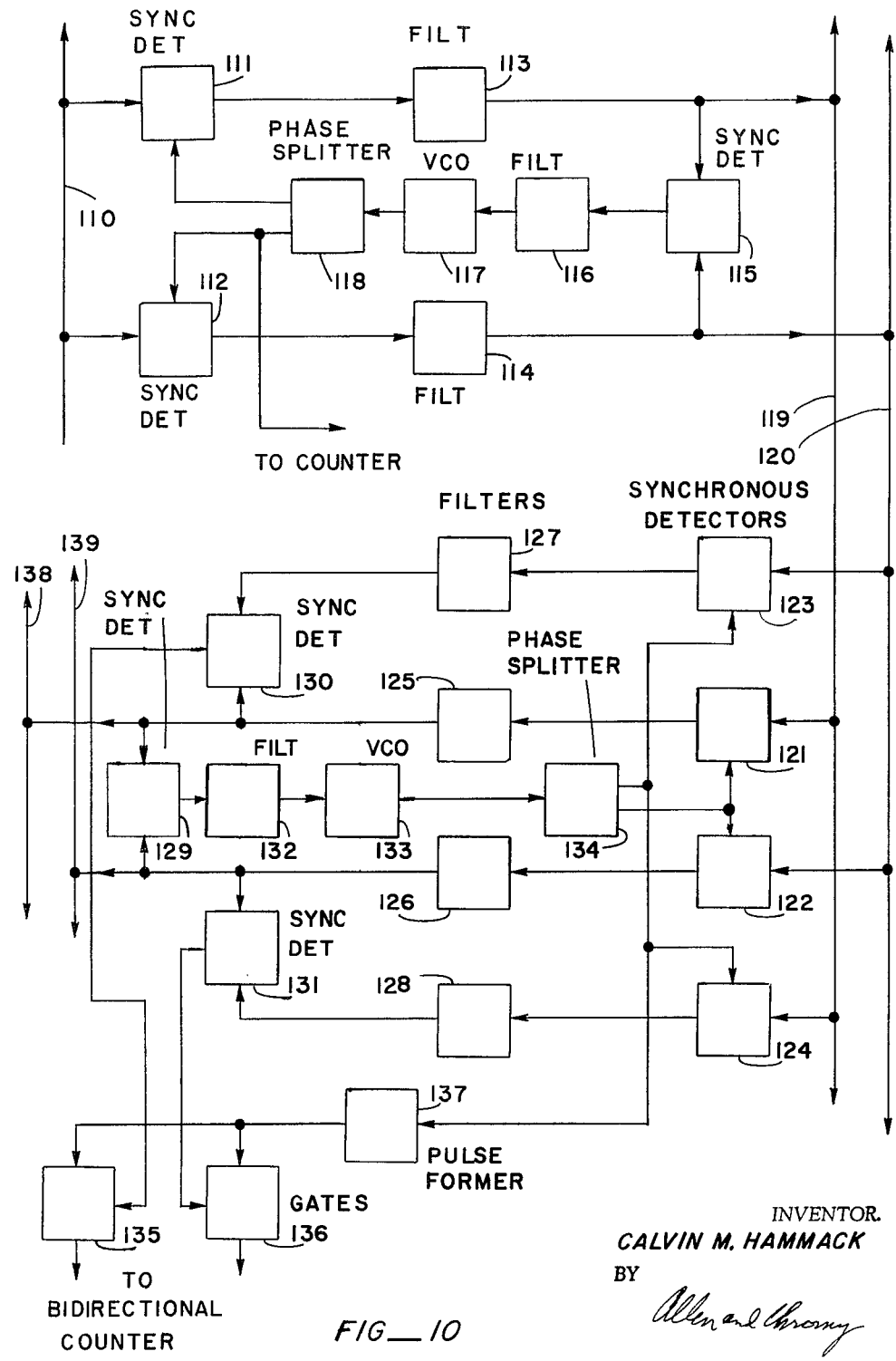
FIG_10

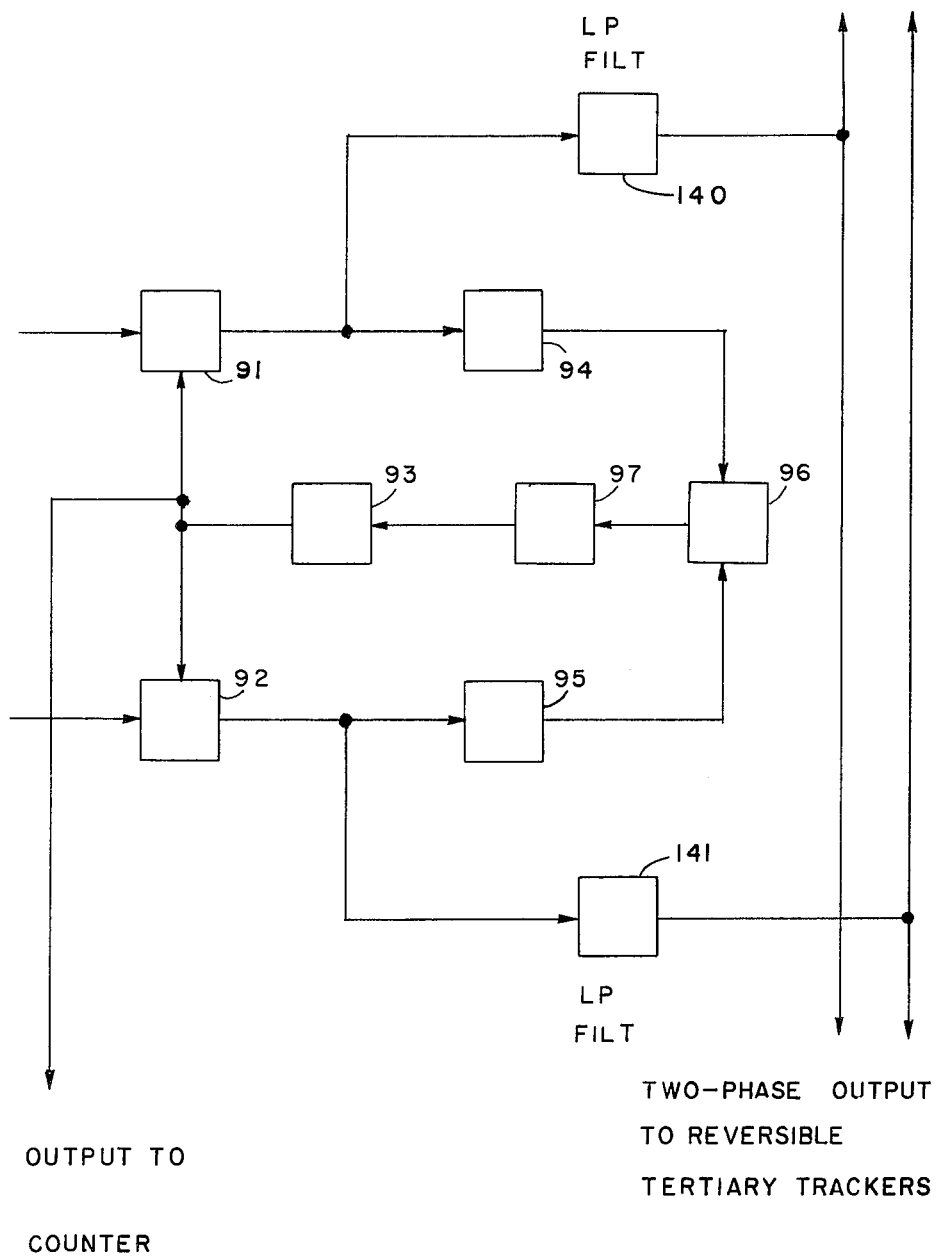
FIG__11

United States Patent Office 3,242,487
Patented Mar. 22, 1966

3,242,487
DETECTION AND TRACKING OF MULTIPLE TARGETS
Calvin M. Hammack, P.O. Box 304, Saratoga, Calif.
Filed Dec. 5, 1963, Ser. No. 335,454
26 Claims. (Cl. 343—7)

This is a continuation-in-part of applications Serial No. 86,770, filed February 2, 1961 and Serial No. 278,191, filed May 6, 1963. My invention relates to the art of detecting and tracking moving objects by means of sonic waves, electromagnetic waves, or other means, and in particular to detecting and tracking simultaneously a plurality of such moving bodies and the precise determinating of their positions and motions relative to each other.

My invention is related to the method disclosed in my co-pending patent applications Serial No. 86,770, filed February 2, 1961 and Serial No. 278,191, filed May 6, 1963. Whereas in those disclosures measurements were performed relative to each target individually, in this disclosure the method includes measurement of geometrical relationships of the positions and motions of the separate moving bodies relative to one another. The definitions and terminology employed in these co-pending applications are also employed in this application. Methods of solutions of equations and formulation of equation sets set forth in these prior applications may be used in the improved methods of this patent application.

In my inventions described in patent application Serial Nos. 86,770 and 278,191 methods and means are described for determining the position in space of a moving object by observations of the Doppler effect on waves propagated between the moving object and several stations whose positions are known. Further, means and methods are described therein for simultaneously locating several targets within the surveillance volume of the system and for tracking these targets simultaneously. Several methods are disclosed and described in those applications for separating the various target echoes, received by each receiver as the result of simultaneous observation of several targets, into groups. Each group consists of one signal from each receiver, and each of said groups contains the complete array of information required for the determination of the position of just one target. In the systems described, each of the target echoes is separately processed by individual counting equipment. Reliance is placed upon the electrical system to sort out and distinguish between the signals from the various objects being tracked. When two or more objects are close together and traveling on parallel courses and at the same speed this separation of signals from the various targets becomes difficult. Furthermore, the precision of the computation required similarly increases as it is attempted to establish the differences between close, parallel courses.

In the method described in the previous application the position of each target object in a group was determined relative to the known positions of the stations of the system and without regard to the other targets either in the group or elsewhere. Thus the error of the system as determined by the errors in electrical measurement, the system geometry, and the capacity of the computer determines the ability of the system to resolve targets within the group and to determine the position of the targets wihin the group relative to each other.

In most applications where it is desired to separate out the individual objects of a group, it is desired to obtain the positions of the members of the group relative to each other. Typical applications where such knowledge is desired are: aircraft rendezvous, space docking, miss distance indication (missile and target), tracking fragments of a disintegrated rocket or other vehicle, control of the formation of a fleet or squadron of vehicles, collision avoidance, terminal guidance of antimissile missiles, and turbulence measurements. In such applications the accuracy with which the positions of the members of the group may be determined relative to each other is of much greater importance than the accuracy of the location of the group as a whole.

It is therefore an object of my invention to provide a method and means for acquiring and processing data in a manner to discriminate between targets of a group and to provide accurate indication of the positions of the members of the group relative to each other even when accuracy of the simple system is not sufficient to permit taking the difference of independent position determinations to find the relative positions of the targets.

It is a further object of this invention to permit the determination of the positions of each object of a group of moving objects relative to each other by electrically separating and identifying the signals of each of the objects being tracked.

It is a further object of this invention to determine the positions of two objects relative to each other by measuring the "beat" or interference between their signals at the measuring stations.

It is a further object of my invention to provide a method of determining the positions of individual objects of a group of objects relative to each other using measurements associated with the motions and positions of the objects relative to each other and information relative to the position and motion of the group of objects derived from other sources.

It is a further object of my invention to provide a method, using polystation Doppler techniques, of accurately determining the position of each object of a group of moving objects relative to the other objects in the group with practical computer capacity.

It is a further object of my invention to provide a means of determining the relative positions of moving targets or vehicles within a group of such targets or vehicles by continuous wave means without any knowledge of previous positions of the targets or vehicles nor of the kinds of trajectories followed by the targets or vehicles, nor requiring auxiliary methods of "lane" or "zone" identification common to some continuous wave systems of other types.

One advantage of the Polystation Doppler systems lies in the fact that no phase coherence is required between various receiving or transmitting stations in the system. There need not be any electrical or radio connection or communication channel between the stations for the purpose of performing the primary measurements. In the so-called "hyperbolic systems" (loran, mistram, etc.) stations must operate in pairs to make the primary measurement. The output of each member of a given pair must be combined with that of the other member of the pair to produce the required difference signal. Errors or variations in the phase propagation through the transmission circuits connecting the members of a given pair together can cause a serious error in the operation of the system. If the antennas are far apart, as might be the case when one wishes to attain maximum accuracy in locating a distant target, the variations in the characteristics of the propagation path particularly in the neighborhood of the individual stations can cause a very serious error in the system. With improvement in the art of information transmission systems and the exercise of great care and sophistication, all at additional cost, it eventually may be possible to achieve the necessary phase stability and accuracy in the electrical or other communication link joining the stations. However, the vagaries of the propagation path remain beyond the scope of these improvements. These additional costs and the vagaries of nature place "hyperbolic" and also "elliptical" systems at a fundamental disadvantage in comparison to the Polystation Doppler systems.

It is then a further object of my invention to provide a means of determining the relative positions of moving objects within a group of such objects without the necessity of providing accurate or highly stable electrical circuitry or communicating means between the stations of the measuring system.

It is a further object of my invention to provide a means of determining the positions and motions of moving reflecting objects relative to each other that is resistant to the effects of the vagaries of wave propagation by making the operation of the system independent of the phase of the signals arriving at any receiving antenna.

It is a further object of my invention to provide a method of identification of targets or groups of targets and determining the nature of targets or groups of targets by observation of the modulation of an incident continuous wave caused by variation in the reflective characteristics of the target or group of targets.

It is a further object of my invention to provide a method of grouping the echo signals, in a system of several transmitters, according to their respective moving reflectors by observing the modulation produced by variations in the reflecting characteristics of each reflecting target upon incident continuous waves.

It is a further object of my invention to provide a means of determining the relative positions of moving objects within a group of such objects without the necessity of electrically combining the outputs of any two or more channels or two or more stations in performing the fundamental measurements of the system thereby avoiding the need for electrical or other circuit connection between the stations of the separate measurement channels and also thereby reducing in some instances the number of stations required.

It is a further object of my invention to deny the hostile forces the knowledge or the possibility of acquiring the knowledge as to when their own missiles, aircraft, or other vehicles are being tracked or when they are under surveillance by maintaining a constant illumination of the surveillance space by the transmitter or transmitters of the system in both time and space. Thus any target within the surveillance volume is constantly illuminated by a simple unmodulated wave regardless of its position within the volume.

When Polystation Doppler techniques are employed to acquire or track passive or reflective targets there arises the problems common to most radar systems of interference caused by other targets than that which it is desired to detect or track. A typical problem of this sort arises through the intentional saturation of the electromagnetic detection system employed by antimissile batteries through the use of modulating decoy reflectors. Decoy reflectors that are of irregular shape or perhaps corner reflectors may be projected through space in company with a hostile warhead. As these targets spin on their own axes the variation in their reflective characteristics as observed by Doppler tracking stations may have superficial resemblance to multiple targets on separate courses.

It is therefore an object of my invention to provide a method and means for reducing the effects of the modulation sidebands in creating interference and confusion to efforts to detect and measure signals not directly related to that of the interfering modulated signal.

It is a further object of my invention to provide a method for eliminating a single unmodulated signal from a spectrum of signals so that measurements may be performed on the signals remaining in the spectrum with greater ease.

It is a further object of my invention to provide a means and a method of keeping the signal cancellation circuit tuned or "locked on" the signal to be eliminated.

It is a further object of my invention to maintain the balance between the signal of the original spectrum to be eliminated and the cancellation signal by comparing these two signals, substracting the one from the other and minimizing the difference by using this difference to control the amplitude of either the original signal spectrum or the cancellation signal or both.

It is a further object of my invention to provide a method of identifying individual sideband signals as being the result of modulation and belonging to a spectrum of sidebands set up about a single echo discerning it from the signals resultant from other echoes and the sideband components of the other echo signals in the spectrum.

It is a further object of my invention to provide a method of distinguishing between signals caused by modulation of signal echoes, such as by oscillation of a reflector, and the "beats" produced by two or more simple targets traveling in such a manner that the rates of change of the lengths of propagation paths are close to each other but sufficiently different to produce the illusion of modulation.

It is a further object of my invention to provide a method of determining the positions of objects by propagation of waves in any medium capable of propagation of waves and through which objects can move.

It is a further object of my invention to provide a method of determining the positions of objects that is capable of operating in conjunction with any means of transmitting, reflecting, and receiving waves or quanta.

It is a further object of my invention to provide a method for obtaining within a single system means for simultaneously determining the positions of a plurality of moving objects that are reflective, moving objects that possess cooperative receiving means, moving objects that possess cooperative transmitting means, and moving objects that are transmitting in a noncooperative fashion, while at the same time employing the data acquired by the system to determine the positions of stations and reference points forming parts of the system, including the functions of resolution of ambiguities, and the detection of, compensation for, or accommodation of instabilities and inaccuracies of local frequency and timing standards at the various points of the system, and wherein the receiving system and computing means or part thereof may be located on the ground or be on a moving object such as a submarine, aircraft, or space vehicle, and wherein the transmitting means enjoys the same freedom of placement.

It is a further object of my invention to provide a method of detection of, compensation for, or accommodation of instabilities and inaccuracies of local frequency and timing standards located at the various points of a multistatic system or aboard cooperative vehicles of the system.

It is a further object of my invention to provide a method of determining the positions of moving objects and reference points, determining the relative frequency displacements of oscillators at separate points by making appropriate measurements of geometrical changes and solving a set of simultaneous equations comprising equations relating the measured values to the unknowns and equations relating certain of the unknowns to each other.

It is a further object of my invention to provide a means of identification of ground transmitters of a multiple transmitter type reflective Doppler system by determining the positions of the ground stations through computations based on the measurements of the system and the geometrical relationships involved. The transmitters of the system may then all be assigned to the same frequency and operated without identifying modulation thus confusing unfriendly ferreting operations.

It is a further object of my invention to avoid the occurrence of ambiguity in a polystation Doppler system operating on reflective targets by employing a set of simultaneous equations in which the coordinates of all of the targets contributing to the ambiguity appear and solving this set of equations simultaneously for all of the coordinates of all of the targets.

It is a further object my invention to avoid the occurrence of ambiguity in a polystation Doppler system operating on reflective targets by solving for the positions of all the targets at once by employing a single set of simultaneous equations which includes the coordinates of all of the target objects and includes equations relating the motions of the separate moving objects to each other.

It is a further object of my invention to provide a method for the simultaneous unambiguous determination of the positions of a plurality of moving objects through the use of equations relating to each other the motions of the various moving objects.

It is a further object of my invention to provide a method of determining the positions of a plurality of moving objects simultaneously by observation and measurement of the difference of the Doppler effects relative to the separate moving objects.

It is a further object of my invention to provide an improved method for the unambiguous determination of the position of each of a plurality of moving reflectors by performing a redundant set of Doppler measurements relative to the moving reflectors and relative to a number of reference points, incorporating this data into a nonredundant set of simultaneous equations and solving these equations for the positions of the reflectors.

It is a further object of my invention to provide an improved method for the unambiguous determination of the position of each of a plurality of moving reflectors by performing a redundant set of Doppler measurements relative to the moving reflectors and relative to a number of reference points incorporating this data into a set of simultaneous equations and solving this set of equations for the positions of the reflectors relative to each other.

It is a further object of my invention to provide a method of examining the received signals echoed from the targets so as to obtain knowledge of the reflection characteristics and rotational motion of targets whose echo signals are thus modulated and, in the same operation, to detect any modulation of the echo signals owing to other causes.

Referring to the drawings briefly:

FIG. 1 indicates the trajectory of a pair of targets relative a transmitter-receiver station combination with uniform velocity of separation of the targets;

FIG. 2 shows a typical reentry trajectory of an ICBM and decoys;

FIG. 3 shows a block diagram of a sensor system and its relationship to a group of targets;

FIG. 4 is a block diagram of a receiving station;

FIG. 5 is a block diagram of the group frequency tracker;

FIG. 6 is the block diagram of the target frequency tracker;

FIG. 7 is a block diagram showing the interconnections of the phase tracking, counting, and data handling equipments of a receiving station;

FIG. 8 is a block diagram of a group tracker providing a two-phase output for secondary tracking derived from its own automatic gain control and automatic frequency controlled circuits;

FIG. 9 is a block diagram showing a secondary phase tracker employing sideband tracking driving a tertiary tracker capable of tracking unmodulated signals;

FIG. 10 is a block diagram showing a primary tracker capable of sideband tracking driving a secondary tracker capable of tracking two-phase signals and indicating the sense of the signal; and FIG. 11 is a block diagram showing a two-phase tracker employing sidebands for phase tracking and providing a two-phase output through low pass filters.

*Multiple targets*

It is possible to determine the relative positions of two closely spaced moving targets by observation of the interference phenomenon or "beats" produced relative to each of several separate stations. In principle, it is possible to extend this technique to any number of targets.

In tracking the signals of more than two targets having similar simultaneous paths it is sometimes convenient to employ equipment to track the signal of each target separately, observing the beat or difference signals of each target with respect to a signal generated at the receiving station. This signal is so controlled that it simulates a target of exceptionally large cross section traveling in the target group. This signal then serves as the reference with respect to which all other signals may be measured.

While the concept of a "beat" or "interference" signal is well established in the case of continuous waves, the usage of these terms in reference to pulses may not be familiar. Pulse coincidence phenomena provide operational characteristics very similar to the "beats" of continuous waves.

One of the differences between this invention and the invention described in my previous patent applications is that in this system observations are made relative to two or more targets. The data so detected is subsequently used by itself or in conjunction with similar data from other stations or channels to determine the desired information. In the systems described in the co-pending applications data is derived and employed separately relative to each target. In this manner a Dopper system is capable of determining the position of a member of a group of targets relative to the coordinates of the system thereby roughly locating the group.

Knowledge of the position of the target group is necessary to the method described in this application. It is a modification of this invention to employ the same stations and much of the same equipment both for the determination of the position of the target group and for the determination of the positions of the targets within the group relative to each other. The information derived from the determination of the group position by the computer is employed subsequently by the same or another computer to determine, on the basis of additional information secured from each receiver, the positions of the targets within the group. However, it is not necessary that a Doppler system or even a multiple station system be employed to obtain the information as to the position of the target group. It is feasible for instance to employ a conventional radar to determine the position of the group of targets and employ the methods described in this application to determine the relative positions of the targets within the group.

The fundamental measurement performed by each channel in this improved method resembles but is different from the measurements made in the previously described Polystation Doppler system. In the methods described in the co-pending applications, the received signal was compared to a local standard. In systems employing simple continuous wave means the number of beats between the received signal and the signal from a local frequency standard were counted to obtain the total phase shift between the two signals occurring in an interval of time. The number of cycles of such phase shift multiplied by the wavelength provides an accurate measurement of the change occurring in the length of the propagation path.

In this improved method characteristics of two or more simultaneously received signals from separate, spaced moving sources or reflectors are measured relative to each other or relative to a common standard.

The measurement of "beat" signals, interference signals, or differential signals from such sources or reflectors can be accomplished with great accuracy in situations where the size of the group is small compared to the ranges from the group to the various stations. In such cases the propagation paths between the targets and any of the stations of the system are very similar. The effects of vagaries of the characteristics of the propagation medium tend to be cancelled since the detecting receiver is only sensitive to the difference in the changes of the lengths of the propagation paths associated with the various targets. One is then able to take advantage of a sort of micrometer effect where one examines a much smaller region with much greater precision. Also, in reflective systems or systems where transponders are carried aboard a moving target vehicle, the requirements for frequency stabilization between the transmitter and receiver are relaxed if the same transmitter illuminates all objects in the group since only signals of difference frequencies are observed. This factor not only permits greater flexibility in the design of specific systems but also makes possible great accuracy in the determination of the relative positions of several targets.

Use of differential measurement relationships

Consider a measurement system as shown in FIGURE 1 composed of a transmitter located at point $(a_T, b_T, c_T)$ and a receiver located at points $(a_R, b_R, c_R)$. The measurement system may be tracking a target group comprising two reflecting targets closely spaced relative to the displacement of the group center occurring during an interval corresponding to a particular measurement. The coordinates of the position of the group may be designated $x_0$, $y_0$, $z_0$ at the epoch of the initiation of the measurement and $x_j$, $y_j$, $z_j$ at the epoch of the termination of the measurement. The measurement of the change in phase of the beat signal between the two echo signals from the pair of reflecting targets is multiplied by the free space wave length to obtain the total difference in the change of the propagation path lengths occurring in the measurement interval. Let this measured geometrical quantity be designated $M_j$. The displacement, one from the other, of the two targets along the cartesian axes may be designated $\Delta X_0$, $\Delta Y_0$, $\Delta Z_0$. The ranges from the transmitter to the target group center at the initiation and termination of the measurement are indicated by $r_{T0}$ and $r_{Tj}$ respectively. The ranges from the receiver to the target group center at the initiation and termination of the measurement interval are $r_{R0}$ and $r_{Rj}$ respectively. The following equation then expresses the relationship between these several quantities:

$$(I)$$

$$M_j = \left(\frac{X_j - a_T}{r_{Tj}} + \frac{X_j - a_R}{r_{Rj}}\right)\Delta X_j + \left(\frac{Y_j - b_T}{r_{Tj}} + \frac{Y_j - b_R}{r_{Rj}}\right)\Delta Y_j$$

$$+ \left(\frac{Z_j - c_T}{r_{Tj}} + \frac{Z_c - c_R}{r_{Rj}}\right)\Delta Z_j - \left(\frac{X_0 - a_T}{r_{T0}} + \frac{X_0 - a_R}{r_{R0}}\right)\Delta X_0$$

$$- \left(\frac{Y_0 - b_T}{r_{T0}} + \frac{Y_0 - b_R}{r_{R0}}\right)\Delta Y_0 - \left(\frac{Z_0 - c_T}{r_{T0}} + \frac{Z_0 - c_R}{r_{R0}}\right)\Delta Z_0$$

It is readily seen that if the coordinates of the position of the target group are known at the epochs of the initiation and termination of the measurement the displacements, one from the other, of the two targets along each of the coordinate axes may be determined by employing a number of transmitting and receiving stations simultaneously. One transmitting station may be employed in cooperation with a number of receiving stations or one receiving station may be employed in cooperation with a number of transmitting stations or there may be various combinations of numbers of transmitters and numbers of receivers. For example, one may employ a single transmitter and six receivers. There then result six simultaneous measurements. One can then write six equations of the Type I. These equations may be solved simultaneously for the unknown values of $\Delta X_0$, $\Delta Y_0$, $\Delta Z_0$, $\Delta X_j$, $\Delta Y_j$, $\Delta Z_j$.

Several consecutive contiguous measurements may be performed by each receiving station using the same starting epochs but successively different termination epochs, each receiving station performing its measurements simultaneously with the performance of similar measurements by the other stations. The number of stations employed may then be reduced as it is only necessary that the number of independent measurements be equal to the number of unknown quantities whose values are to be determined. For instance if there are four receivers operating in cooperation with a single transmitter and each receiving station performs three measurements simultaneously with three measurements performed by each of the other three receiving stations it is readily seen that there are twelve unknowns which may be determined from the twelve measured values and the twelve resultant simultaneous equations.

It is common mathematical practice to arrange the coefficients of the simultaneous equations in a matrix. The matrix is a convenient way of stating the equations set and may be manipulated algebraically.

When the dimensions of the group are small and the group is in motion, the "error matrices" described in my previous application Serial No. 86,770 are directly applicable not only for the determination of the relative positions of targets within the group but for the determination of the error in the determination of the relative positions. A number of the error matrices, by no means a complete listing, are indicated in the previous application. Each matrix corresponds to a separate and distinct system configuration or operational mode. These error matrices express exactly the vector ratio between the infinitesimal displacement in the cartesian coordinates and infinitesimal variation of the measured values of change of range. To be employed for the determination of the relative positions of the members of the group of targets when the positions of the group at the starting point and at each of the points where readings are taken it is only necessary to substitute the beat, interference, or differential data for the error in range difference. The coefficients of the matrix are determined by the known coordinates of the stations and the target group. The positions of the targets relative to each other are then found by inverting the matrix and postmultiplying by the vector formed of the readings of the beat, interference, or differential signal or equivalent data derived by taking the differences of measurements.

Once the positions of the moving group of targets are determined the solution for the positions of the targets relative to each other is simply the simultaneous solution of a set of linear equations. Furthermore, if the same Polystation Doppler system and computer are employed to find the position of the group as are employed to find the relative positions of the targets or sources within the group the required inverted error matrix is established in the process of finding the position of the group if the Newton Raphson or similar iterative solutions are employed in that step.

Use of differential motion relationships

In co-pending patent applications Serial No. 86,770 and Serial No. 278,191, it is shown that when there exists knowledge about the path of the target or cooperative vehicle being tracked there results simplifications or capabilities not otherwise obtainable. For instance, knowledge that the vehicle source or target is traveling along a straight line not through the observer at constant speed permits one to determine the range to the target from a single station by making doppler measurements only. Similarly, it is possible to simplify methods or achieve capabilities not otherwise obtainable through knowledge of the motion of the targets of a group relative to each other. The motion of the group as a whole might be complex, yet some simple and known relationship between the individual members of the group can be of great value in the tracking method.

An example of a condition in which a simple and reasonable assumption permits of far reaching capabilities is that in which two targets are separating at constant velocity. The spacing of the pair is assumed to be small compared to the ranges of the pair to the stations and compared to the diameter of the station system. The position of the target pair is known relative to the cartesian coordinate system as are the coordinates of the observing station and the illuminating transmitter. The positions of the two targets relative to each other is unknown. It is desired to know the positions of the targets relative to each other in all three dimensions. The geometrical relationships of this problem are shown in FIG. 1 for the condition where there is equal time spacing of the readings. Equations associated with the problem are:

II $$\Delta X_j = \Delta X_0 + X_X t_j$$
$$\Delta Y_j = \Delta Y_0 + V_Y t_j$$
$$\Delta Z_j = \Delta Z_0 + V_Z t_j$$

The target group consisting of a pair of targets is shown as moving from position $x_0$, $y_0$, $z_0$, where the measurement sequence begins, through position $x_6$, $y_6$, $z_6$, where the last reading is taken. The targets are shown separating in a linear fashion along all three coordinate axes. Six readings are required, and therefore seven positions of the target group are shown relative to the measurements. Although the diagram for the purpose of clarity shows the distance between the targets as appreciable compared to $r_{T_j}$ and $r_{R_j}$ from the target group to the stations this distance is small compared to the ranges. The path of the target group is not necessarily linear and there are no assumptions made relative to the group path. The position of the group at the point corresponding to each reading is known by means of other parts of the system or from outside information. The transmitter and the receiver are located at points $a_T$, $b_T$, $c_T$ and $a_R$, $b_R$, $c_R$ respectively. The distance between the transmitter and the receiver is not critical. In fact, as far as the geometrical and mathematical aspects of the problem are concerned, the transmitter and the receiver may be located at the same station thereby achieving some simplification of Equation I.

Equation I relates to the relatively small distances of separation of the targets along the three cordinate axes to the measured change in the difference between the two propagation paths associated with the two targets. This measured change is indicated by $M_j$. The quantities in the parentheses are the sums of the direction cosines of the range vectors of transmitter and receiver. These values are derived directly from the known data. The unknown quantities are those with the delta prefix. Equation I is written for the $j$th reading as shown by the $j$ subscript. Equations II indicate the relationship between the separation of the targets along each of the three coordinate axes, the rate of such separation, and the separation at the beginning of the measurements. The equations are written for the $j$th position of the group as indicated by the subscript $j$. The zero subscript indicates the magnitude of separation of the targets at the time of initiation of the measurement sequence, $V_x$, $V_y$, and $V_z$ indicate the rate of separation along the $x$, $y$, and $z$ axes respectively. The symbol $t$ represents time since the initiation of the measurement sequence. $t$ is the only quantity in Equations II that is known; all of the other elements are unknown. Substituting from Equations II into Equation I there is obtained a single equation with the three values of the separation at the beginning of the measurement sequence $\Delta X_0$, $\Delta Y_0$, and $\Delta Z_0$ and the three values of the rates of change of the separation $V_x$, $V_y$, and $V_z$ as the only variables. The resultant equation has then six unknown quantities. Six such equations may be obtained by taking six successive readings. Each of these equations is independent of the others; and each is concerned with the same identical unknowns as the others. This set of six independent equations in six unknowns can be solved simultaneously for the values of the six unknowns. Since the equations are linear in the unknowns the process of solution is simple.

It is of importance here to note that, given the position of the target group at the epochs of the beginning and ending of all measurements, only a single Doppler receiving station operating with a single transmitter is required to determine the relative positions of the targets within the group at these epochs. Since the process involves only linear equations the method may be employed for obtaining initial approximations in instances where it is not sufficiently accurate for direct usage. Furthermore, simultaneous independent position determination using several different station combinations permits the resolution of ambiguity during one portion of a trajectory for possible use later in the trajectory when assumptions about relative motion may not be made.

The use of six readings permits linear equations to be employed. Only four equations resulting from four readings need be solved simultaneously provided nonlinear equations may be employed as follows. A third group of equations displayed below show the relationship between the velocities along each of the coordinate axes and the total velocity of separation $V_T$.

III $$V_X = \frac{\Delta X_j}{\sqrt{\Delta X_j^2 + \Delta Y_j^2 + \Delta Z_j^2}} V_T$$

$$V_Y = \frac{\Delta Y_j}{\sqrt{\Delta X_j^2 + \Delta Y_j^2 + \Delta Z_j^2}} V_T$$

$$V_Z = \frac{\Delta Z_j}{\sqrt{\Delta X_j^2 + \Delta Y_j^2 + \Delta Z_j^2}} V_T$$

In the case under discussion this velocity is constant in magnitude and direction. When Equations II and Equations III are substituted in Equations I there are only four unknowns. The separation at the start of the measurement sequence and the velocity $V_T$.

In the example just cited the motion of the two targets relative to each other and relative to a fixed system of cartesian coordinates is linear. Any nonlinear motion that is known or assumed similarly provides an opportunity for calculation of the relative positions of the two targets. In general the higher the degree of the nonlinearity of the relative motion the greater the number of readings that must be taken to complete the equation set; that is, to get the number of equations equal to the number of unknowns. The number of unknowns is determined by the degree of the relative motion expressed as a function of time. Since there are three dimensions there must be three readings taken for each coefficient in the motion equations. The number of readings taken is three times the degree of the motion equation plus three. This method depends for its accuracy upon substantial movement of the target group during the measurement sequence.

In a co-pending application, Serial No. 278,191, I have shown how it is possible to reduce the number of stations in a Polystation Doppler system without knowledge of the path by taking a sufficiently great number of readings over the measurement interval. A precision of position determination is obtained that is only limited by the precision of the measurements and by the geometrical degradation of precision. A similar though not identical procedure exists relative to the simple two target method just described. The three equations of the type shown at II are written in as high a degree as necessary to provide the desired accuracy. As before these equations are substituted in Equations I. For this method to be effective the group must have sufficient motion during the interval of the measurement sequence that the coefficients, shown in the parentheses of Equation I, are sufficiently different for each of the equations resulting from successive measurements to permit satisfactory accuracy. The motion of the target group required for adequate accuracy is dependent upon the degree of the equations of motion of the two targets relative to each other. There is no particular relationship between the nature of the group motion and the operation of the method, so long as sufficient group motion takes place.

It is important to note that only a single transmitter-single receiver Doppler system is required for determination of the relative positions of the targets with no assumptions as to the characteristics of the relative motion of the targets other than that the paths of the two targets are continuous. The displacement of the targets or sources relative to each other must be small compared to the displacement of the group.

Methods of solution have been presented where the relative motion is perfectly linear and where the relative motion is completely unknown, and there has been a discussion of solutions where the motion is expressed in terms of a defined polynomial. Other equations of motion such as the equations of circles, ellipses, confinement to a plane, and so forth may be employed. These other relationships of motion may be substituted in place of those described herein. Reference is made on this subject to my co-pending application Serial No. 278,191.

*Using more than one transmitter-receiver pair*

The combination of a single receiving station operating in cooperation with a single transmitting station will be called a transmitter-receiver pair. Either the transmitting station or the receiving station may operate in cooperation with more than one station of the opposite type. Two transmitters operating with a single receiving station would constitute two transmitter-receiver pairs according to this definition. The system of operation just described constitutes a single transmitter-receiver pair. The operation of systems comprising more than one transmitter-receiver pair is now to be described.

If a single reading is made in a system containing six transmitter-receiver pairs only equations of the Type I are required. Each station pair makes a single measurement simultaneously with the other five. There are six independent equations in the same six unknowns. Simultaneous solution of these six linear equations provides the separation of the target pair along each of the three coordinate axes at the initiation of the measurement and at the termination of the measurement. Thus six unknown quantities are determined from six independent measurements. The method is completely independent of the charactertistics of the relative motion. The relative motion is assumed to be small compared to the motion of the target group. Other combinations of the number of transmitter-receiver pairs and the number of readings may be employed such as four station pairs and three readings. The number of readings depends only upon the number of transmitter-receiver pairs employed and not at all upon the characteristics of the relative motion of the targets.

When equations of motion such as Equations II are employed the number of readings required of the system may still be reduced by the use of more than one transmitter-receivers pairs. For example three transmitter-receiver pairs may be employed, each taking two readings. Equations II would be employed. A total of six unknowns would be determined from a total of six measurements. By taking more readings more complicated relative motion between the targets may be accommodated. As with a single station enough readings may be taken to accommodate any complexity of motion as long as the motion is continuous and the motion of the group is sufficiently great that the coefficients of the simultaneous linear equations are sufficiently different for each equation. A wide variety of operating modes are available for various combinations of numbers of readings, types of relative motion, and number of stations. It is not proposed to limit my invention to any one or any group of such combinations.

*More than two targets*

When a target group is formed of more than two targets the most expedient method of determining the relative positions of each member of the group relative to all the other members of the group is to determine the positions of an adequate number of pairs of targets relative to each other. One target echo can be taken as a reference and all other target positions may be determined relative to that one reference. This reference may be a phantom echo created instrumentally by the system apparatus. This artificial target may also serve as a good reference for the group position. The coordinates of the group may be given in terms of the artificial target and all other target positions given with reference to the artificial reference target. All of the analysis presented on systems for operation on target pairs is then directly applicable to any group of more than two targets by considering the target group as made up of pairs of targets.

*Multiple targets widely separated*

The principles of my invention may be employed in the determination positions of moving objects forming a group of such objects that are widely separated from each other. Measurements of the changes of the differences of the wave propagation paths associated with a plurality of moving objects are performed with instrumentalities of the type described in this application. Employing the data derived from such measurements "multiple target measurement equations" as described in my co-pending patent application Serial No. 278,191 may be written and employed as described therein to obtain the positions and relative positions of multiple targets.

*Radiation emitted by the targets and reflected by other targets*

The principles of my invention may be employed in systems wherein one or more of the targets emits waves which are received directly by the receiving equipment of the system and are also reflected by one or more of the other targets from whence they are propagated to the receiving equipment. The measurement equations are readily synthesized from the geometry but are omitted here for brevity.

*Frequencies, rates and velocities*

Although my invention is described in this patent application in terms of finite changes of measured quantities and position coordinates the underlying principles of my invention are not changed by the performance of the measurements over infinitesimal time intervals and the inclusion of the concepts of rate of change, frequency and velocity and time derivatives thereof, as is made clear in the two referenced patent applications. Apparatus for performing frequency measurements and for measuring the higher derivatives of the frequencies is also shown in the two referenced patent applications.

*Anti-ICBM sensor system*

A very important application of my invention is in the art of detecting the presence of hostile ballistic missiles and directing rockets or other weapons to destroy the warheads of such missiles. This problem is one of extreme difficulty when approached with conventional radar equipment. The targets are moving at great speed and must be detected and tracked at long ranges. Furthermore, the enemy has conveniently available a method of surrounding the warhead with a large number of decoys sufficiently removed from the warhead that a single shot could not account for all of them and yet sufficiently near to confuse tracking of the individual decoys and the warhead by conventional means such as electrically steered high speed scanning antenna arrays.

One specific threat that my invention is designed to counter is the so-called "intercontinental ballistic missile" commonly designated ICBM. This vehicle is launched at distances as great as half way round the earth from its target. The powered portion of its flight is limited to the first few minutes though there is no guarantee that power may not be applied later in the trajectory. The missile then curves upward to great heights beyond the atmosphere. Sometime after all power is expended warhead is separated from the propulsion unit and the propulsion unit blown apart. Some of the pieces overtake the warhead, others fall behind, the main group and others move laterally with respect to the main line of flight of the group. During reentry the flight characteristics of oddly shaped pieces of wreckage may be expected to deviate from that of the true warhead owing to the difference between the aerodynamic characteristics of the decoys and the warhead. The use of more sophisticated decoys is entirely probable also. It is necessary to possess equipment and systems and methods of tracking very accurately each decoy in addition to the warhead so as to be able to determine the most probable of the targets and to direct fire at those chosen.

To help confuse the situation the enemy also has the option of imparting rotational momentum to either the propulsion unit before it is blown apart or to several separate pieces after the explosion. Such rotation of the separate pieces will cause a modulation of the radiation reflected from it, thus causing more clutter and confusion. Finally, of course, the enemy may employ self-radiating electronic counter-measure equipment.

The peculiar properties of the target to be tracked by this anti-ICBM system raise many problems. However, some advantages from these properties accrue to the defenders. The problem of ambiguity resolution is greatly simplified for any of the decoys that are not self propelled. The initial small explosion that causes the fragmentation of the main propulsion unit of the missile, including tanks, skin, etc., imparts an impulse to each fragment. Normally this operation would occur above the earth's atmosphere and the momentum acquired by each fragment relative to the moving center of the explosion remaining constant until the fragment group starts to reenter the atmosphere. Thus the fragment group will form a three dimensional pattern whose diameter is expanding uniformly with time. Relative to other members of the group each of the ballistic fragments can be expected to move with uniform velocity away from a common center. This common center may not be the centroid of the entire group since the various objects have different masses and different impulses imparted to them. Also presumably some of the momentum may be in the form of high velocity gas motion. For these reasons the radar target offered by the group may be appreciably off center from the point from which all of the fragments are receding relative to the group.

In FIG. 2 is shown an illustration of the trajectory of an intercontinental ballistic missile and its relationship to one transmitting station and one receiving station which may comprise a total system or only a part thereof. An example of fragmentation is shown. For simplicity, only four fragments are indicated, however there may well be a great deal more. The various events such as fragmentation and reentry are indicated. The uniform expansion of the group pattern is indicated through three points between fragmentation and reentry. During this period between fragmentation and reentry the pattern of the group remains unchanged merely expanding at a uniform rate. Relative to the tracking stations there will be an apparent rotation of the whole group owing to the rotation of the earth during the flight of the group.

Use of the special knowledge of this linear expansion of the group pattern allows one to determine the exact pattern and size of the group; to determine the positions of all targets in the group relative to each other. This information can be obtained on the basis of measurements made by a single receiving station operating in conjunction with a single transmitting station if knowledge of position of the group is available at the significant points along the trajectory. This singular capability is depenedent upon the linear expansion of the target group and the knowledge of the position of the group at the significant epochs. When the reentry starts and the expansion is no longer linear, polystation doppler tracking, as described in my co-pending patent applications, Serial No. 86,770 and Serial No. 278,191 may be employed. When the transmitter and receiver are located at the same site only one station is required to determine the relative positions of the targets in the uniformly expanding target group given the position of the group. In a preferred embodiment of my invention the target group is tracked by the entire system as shown in FIG. 3 in the manner of tracking a single target from the earliest contact. In addition to this tracking of the group as a whole, single transmitter-single receiver combinations, as shown in FIG. 2, are employed using the same stations to determine the relative positions. It is to be noted that no problem of target ambiguity within the target group exists because only a single transmitter and a single receiver are used in each independent position determination in this mode of operation. Redundant data is derived using the various transmitter-receiver combinations available thus providing a greater degree of certainty to the operation. Upon reentry the system has already acquired sufficient data to conveniently resolve the ambiguity problem by correlating the relative positions of the targets as separately determined by each transmitter-receiver combination with the echos associated with each determination.

In a modification of my invention shown in FIG. 3 I have chosen to illuminate the targets with unmodulated continuous wave signals from four space separated transmitters, each operating at a different frequency. The use of continuous waves increases the resistance of the system to countermeasures and facilitates the transmission of the large average power required for any tracking system employed against such targets. In other modifications of my invention, modulated or pulsed waves are employed.

A single receiving station is employed. This station detects the signals from each of the transmitters after they have been reflected from the targets. The receiving station is not located near any of the transmitters, thereby lessening the effects of noise of the transmitters and reducing the probability of the enemy knowing where the receiving equipment is located. The resistance of the system to countermeasures is correspondingly improved as the use of directional equipment to locate the receiving station is denied to the hostile countermeasure effort.

In this modification of my invention beamed or high gain antennas are employed at the transmitters and the receiver. The main reason for employing high gain antennas is to reduce the amount of power required at the transmitters. An additional benefit is the reduction of interference from targets other than those of interest. Possible ambiguities as the result of several target groups appearing in the surveillance volume are thus reduced. The beams of these antennas must be trained to follow the target group and they are broad enough to include the entire group easily. No directional information is derived from the antennas. The antennas must be pointed initially through information as to the location of the group supplied from another system or another part of the same system. This other system may be a system employed for general surveillance. Once the tracking system described here is "locked on" the target group it can maintain its own contact furnishing guidance to its own antennas.

This system then has two functions: the tracking of the target group and the tracking of the positions of the target relative to each other within the group. Initial data as to the relative positions of targets within the group are not required. Only the coordinates of the group as a whole at the time of start of tracking are employed. After the start of tracking this system will continue to track the target group and to determine and track the relative positions of the targets within the group.

In one modification of my invention illumination from a single set of one or more transmitters is employed for both the surveillance and tracking functions simultaneously, and part or all of the receiving subsystem comprising one or more receiving stations is similarly shared in the performance of both functions.

The general block diagram of the anti-ICBM system is shown in FIG. 3. Transmitters 1 illuminate the target group with overlapping beams. The reflected signals from the target group are intercepted, detected, and measured at receiver 2. The information derived by receiver 2 is fed into computer 3. The computer computes the position of the target group, resolves the ambiguities of the echos of the targets in the group and computes continually the relative positions of the targets. This position information constitutes the output data of the system. The computer also calculates the pointing angles for each antenna in the system. The antenna angle information is then transmitted to each of the transmitters and to the receiver. The use of a single receiver simplifies the data handling process as the computer is located at the site of the receiver. In other embodiments of my invention multiple receiving stations are employed in conjunction with a single transmitter or multiple transmitters.

Each transmitter is identical to the others. Each is composed of a standard frequency oscillator and a radio frequency amplifier and a directional antenna capable of being directed by control signals from the computer.

Alternatively, the antennas of the transmitters can be broad beamed. Additional power is required but the broad beams may then be fixed in position, and the transmitters of the system can operate simultaneously with several receiving systems to track a plurality of target groups. Furthermore, these transmitters equipped with the wide angle beams may then also serve with other receiving equipment as a surveillance and acquisition system. The reduced maintenance and the mechanical and electrical simplicity of the fixed beam transmitters in a further advantage of this type of transmitter. Furthermore, the destruction of such a simple transmitting station would not be as serious in terms of lost equipment and lives. When the transmitting antennas 4 are broad beamed it is sometimes appropriate to employ a self-tracking antenna as the receiving antenna 5 particularly if propagation paths are curved.

The receiving system, computer, and controls are all located at a single station. This station will require an estimated ninety percent of the maintenance personnel and all operational personnel of the system. All operational decisions are made at this point and all intelligent acts are performed there. No intelligent operational activity is performed at the transmitting sites. The receiver obtains all necessary data from its own sensing antennas. No data is required from other receiving systems.

A simplified block diagram of the receiving station is shown in FIG. 4. The receiver operates in cooperation with four transmitters and there are, therefore, four channels of equipment throughout most of the system. In other modifications of my method fewer transmitters are employed depending partly upon available knowledge of the characteristics of the path of the moving object and upon the available computer capacity. In still other modifications more than four transmitters are employed to obtain greater precision or greater response speed.

Receiving station

Operation of the receiving station 2 is broadly sketched as follows. The signals of all four of the transmitters having been reflected from the moving targets are intercepted by receiving antenna 5 and amplified in input amplifier 6. The signals emitted by the transmitters are all different in frequency by an amount greater than the expected doppler shifts. However, the frequencies are sufficiently close that the same input system, antenna and amplifier may be employed for the signals from all four transmitters. In some installations it may be desirable to heterodyne the input signal to a lower frequency for more convenient circuitry. Whether the remainder of the system operates at the incoming frequency or some intermediate frequency is not pertinent to the general principle of operation of the system.

The output of the input amplifier 6 feeds four separate channels, one channel for each transmitter operating in conjunction with the receiving station. Furthermore, the diagram is simplified to show only the equipment to track one target group at a time. By the inclusion of more such channels in the system any number of target groups may be tracked. Of course, either broad beamed antennas or separate antennas, or the equivalent thereof such as certain phased array antennas, must be employed to track more than one target group at a time.

The output of the input amplifier 6 is also fed into a broad spectrum analyzer. It is the function of this unit to generate a signal indicating the amplitude vs. frequency spectrum of the signals resulting from the doppler modulated echos of a single transmitter. The broad spectrum analyzer 7 indicates all signals above and below the frequency of the corresponding transmitter and extending from the transmitter frequency by an amount just greater than the maximum doppler shift expected to be observed by the system relative to that particular transmitter. The spectrum analyzer chosen for this system employs the so-called coherent memory principle. Such a device is sold by Federal Scientific Corp. of New York, N.Y. under the trade name Simoramic Analyzer. After the antennas have been positioned using information from other systems or other modes of the same system, the information from broad spectrum analyzer 7 is employed to manually adjust group frequency tracker 8 to the frequency of the target group. The target group will appear as a small group of frequencies on the display of broad spectrum analyzer 7. There may be other targets in the beams of the antennas and judgment of the operator might be required to set the frequency of the group frequency tracker on the right target echo. The information from the acquisition system may include the velocity of the target as well as its position. This information after coordinate processing may be made available to the operator to aid him in placing the group frequency tracker 8 on target.

The group frequency tracker 8 functions as a gate or window in the total tracking spectrum as seen by the broad spectrum analyzer 7. The group frequency tracker 8 provides an output spectrum that is much narrower than the total tracking spectrum. Furthermore, the actual frequency spectrum of the output remains constant in width and the center frequency remains constant. However, the portion or window of the total spectrum that is transferred through the group frequency tracker 8 is variable and may be controlled to scan the total spectrum or may be controlled to follow or "lock on" the target group. Such devices are some times called tracking filters. A similar device is called by this name and is produced by Interstate Electronics Corporation of Anaheim, Calif. The positioning of the window in the total spectrum may be accomplished manually by the operator, by signals from the computer, or by internal control through a feed back loop. One of these control methods is employed to keep the window centered on the frequencies corresponding to the target group.

The spectrum output of the group frequency tracker 8 is fed to group spectrum analyzer 9 which operates in the same manner as broad spectrum analyzer 7 only is restricted in its coverage to just the spectrum included in the tracking window. Thus, when the group frequency tracker 8 is properly tracking the group of signals from the target group, the envelope or spectrum of the echos will be shown in the display of associated group spectrum analyzer 9. The signal spectrum seen on the display of group spectrum analyzer 9 will be a magnified version of a part of the total spectrum seen on broad spectrum display 7.

The output of the group frequency tracker is also fed to target frequency trackers 10. There must be one target frequency tracker for every target in the group being tracked. These target frequency trackers 10 are set on the target frequencies individually by operators who are aided by looking at the displays of the group spectrum analyzers 9 and target spectrum analyzers 11. Signals from the target frequency trackers 10 are fed to the group spectrum analyzers 9 so that the position on the spectrum of each of the target frequency trackers 10 is indicated, thereby aiding in getting the target frequency trackers 10 locked on their respective targets.

The target frequency trackers 10 are much the same as the group frequency tracker 8. The main difference lies in the much smaller width of the spectrum over which the target trackers are required to operate. The group frequency tracker 8 and the target frequency trackers 10 have two outputs each. One output is of very narrow band width and of constant amplitude. This signal is the output of the voltage controlled oscillator within the tracker circuit, and it may be termed a sinusoidal signal of varying frequency. This signal closely follows the phase of the signal being tracked. The other signal from each tracker is a spectrum window centered on the sinusoidal frequency tracking signal just described. The broad-band signal is used for the purposes of aiding in the acquisition and tracking of both the group and the individual target echos, in addition to providing signals for succeeding tracking stages. The narrow band or sinusoidal signal is the signal upon which measurements of phase change are actually performed. In addition, this signal when introduced into the input of a spectrum analyzer provides an indication of the position of the tracking window in the spectrum. These two signals will be referred to as the tracking signal and the spectrum signal. The tracking signals from group frequency trackers 8 are fed into group cycle counters 12 and the tracking signal of target frequency tracker 10 is fed into target cycle counter 13. The outputs of the cycle counters are fed into group shift registers 14 and target shift register 15, respectively. The outputs of the shift registers feed the computer 16. The shift registers record the indications of the cycle counters at the occurrence of command signals from the timer 17. The shift registers also serve as a buffer for the computer. Information is fed to the computer from the shift registers upon demand from the computer. The timer also provides a "time of day" signal that is included in the word fed to the computer so that the time of day reading may be used later to identify the reading.

The computer 16 receives information from the shift registers of all four channels. The output of the computer 16 consists of group position signals in terms of cartesian coordinates, target position signals in terms of cartesian coordinates and, if required, pointing angles calculated for each of the five antennas of the system. The group position and the target position information are fed along with associated timing information to the tactical user.

Frequency synthesizer 18 provides standard signals of the required frequencies to the timer 17 and the group frequency tracker 8 and is stabilized by local standard oscillator 19.

*Group frequency tracker*

The group frequency tracker 8 (block diagram in FIG. 5) has two purposes: (1) to track the frequency of the target group, thereby providing a good signal for operation of the succeeding cycle counter; (2) to provide a spectrum window around the target group for use of the succeeding target frequency trackers 10, thereby clearly indicating the signals of the target group to these trackers and restricting their activity to the target group selected. Thus, there are two outputs from the group frequency tracker 8, the narrow band sinusoid for counting purposes and the frequency spectrum of the target group. The unit also provides amplification and transmitter selection. Tracking may be accomplished automatically, under control of the computer, or manually as determined by the position of switch 20. Manual adjustment can be employed to place the tracker "on target" at the outset of a tracking sequence with subsequent switching to automatic control.

FIG. 5 shows a block diagram of the group frequency tracker 8. The reflected signal from the transmitter having been amplified by broadband input amplifier 6 enters the group frequency tracker 8 through mixer 21 where the spectrum is translated to the intermediate frequency. This intermediate frequency signal is amplified in IF amplifier 22 and subsequently fed to the succeeding target frequency trackers 10 and the group spectrum analyzers 7. The output of the IF amplifier 22 is also fed into the synchronous detector 23. The D.C. and low frequency output signal of the synchronous detector 23 is then fed through filter 24 and switch 20 to control the frequency of the voltage controlled oscillator 25. The variable frequency sinusoid from the voltage controlled oscillator 25 is mixed with a signal from the frequency synthesizer 18 in mixer 26 and fed to filter 27. From the filter 27 the controlled variable frequency is fed both to multiplier 28 for eventual mixing with the input signal and to the synchronous detector 23 as a synchronizing signal.

Each of the transmitters operating with the system has a separate frequency assignment and it is by the frequency that the transmitter is identified at the receiver. The receiving station may operate with a number of transmitters at various locations, choosing combinations of transmitters that are tactically advantageous. The transmitter selection is accomplished by injecting a sinusoidal signal of the appropriate frequency from the frequency synthesizer 18. The range of operation of the voltage controlled oscillator 25 is then shifted or translated to cover the doppler spectrum of the corresponding transmitter. This selection is accomplished by means of switch 29.

*Target frequency tracker*

The target frequency tracker 10 has much the same circuitry as the group frequency tracker with the addition of devices which permit the measurement of changes in phase between the signal being tracked and signals of other frequencies and which permit identification of sidebands of the signal being tracked. The target frequency trackers 10 might be somewhat less sophisticated were it not for modulation of target echos by variations in the reflecting surfaces presented to the tracking system as the individual targets rotate on their own axes. If all of the targets were simple spheres of conducting material the target tracking could be accomplished by means of simple phase locked oscillators or tracking filters. However, the ICBM may be fragmented under several different conditions and circumstances, and provisions must be made in this tracking system to account for a corresponding variety of modulations imposed on the various target echos.

The signals produced by the scintillation of the target are characterized by amplitude modulation or frequency modulation or a combination of both. The carrier or center frequency will usually be present. The modulation frequencies may vary over a considerable range and are thus interspersed with the signals resultant from other targets including their center frequencies and their sidebands. These may be expected to be a large number of targets resultant from the fragmentation of the propulsion device, and the additional signals of the sidebands complicate the procedure of deriving information as to the paths of the various targets. One aspect of these side bands facilitates their identification, the side band signals always come in pairs, one on either side of the carrier or center frequency equally removed from the center frequency and of equal amplitude. These sideband signals may be tracked individually and identified by computational procedures. These signals may also be identified by simple correlation, signals appearing equal distances removed on either side of a large third signal might be assumed to be sidebands. Sidebands may be expected to have a more transient character than the center frequencies. The sidebands may also be identified instrumentally by the target frequency tracker 10 used in conjunction with target spectrum analyzers 11. It is one of the functions of the target frequency tracker 10 to identify the sidebands of the signal it is tracking. An operator is assigned to each target frequency tracker to initiate the tracking on a given target, to monitor the performance of the tracker, to observe any unusual operation, to judge the significance of modulation, and to look for low level signals lying in the region of interference set up by the modulation of the signal that is being tracked. The target frequency tracker 10 possesses the capability of detecting the presence and frequency of signals that are much weaker than the signal to which the tracker is tuned, or to which it is "locked on." There is an advantage in the detection of small signals in the presence of large signals accrued by tracking the frequency of the large signal and examining instrumentally the spectrum relative to the center or carrier frequency of the large signal. Similarly tracking of the small signal may be accomplished most readily by reference to the center frequency of the large interfering modulated signal. The effectiveness of the sidebands of the large signal in interfering with the tracking of the smaller signal is vastly reduced. Target frequency tracker 10 is equipped with several of these devices for the detection and tracking of smaller signals.

The block diagram of the target frequency tracker 10 is shown in FIG. 6. The circuit contains the more or less conventional "phase locked" oscillator comprised of mixer 30, amplifier 31, synchronous detector 32, filter 33, voltage controlled oscillator 34, and multiplier 35, the operation of which is familiar to one skilled in the art and which has been described for the group frequency tracker. The parameters of the circuit are so chosen as to provide for a convenient carrier frequency signal at the output of mixer 30. After filtering and amplification this signal is fed to one of the target spectrum analyzers 11. The output of the voltage controlled oscillator 34 is fed to counting circuits external to the tracker and explained hereinafter. Two synchronous detectors 32 and 36 are employed. These detectors are driven by signals that are derived from the voltage controlled oscillator 34 and which are ninety degrees out of phase with each other. For this purpose one of the signals is shifted ninety degrees from the other by phase shifter 37. The output of the synchronous detector 32 is employed to control the frequency of the voltage controlled oscillator 34. The outputs of both synchronous detectors 32 and 36 are passed through filters 38 and 39 and amplified in amplifiers 40 and 41 which are capable of amplifying D.C. signals. The amplified signals are then fed to target spectrum analyzers 11. The signals shown on the displays of the analyzers are then the frequency spectrums of the envelopes of the phase modulation and the amplitude modulation. There also appears on each of these spectroscopes the complete operational spectrum folded about the center frequency of the signal being tracked. Thus neighboring signals appear at the ouputs of both of these channels and on the displays. However, on one of the channels the amplitude modulation signals are absent and on the other channel the frequency modulation signals are absent.

The signals from these two channels are then fed into the separate stator coils of a small two-phase synchronous electric motor 42. The rotor of this electric motor is a permanent magnet. The two stator coils are in space quadrature with each other. Thus if there are signals of the same frequency in time quadrature on the two channels driving these coils, there is a rotating field that will drive the magnet in the manner of a synchronous motor. If now the target frequency tracker is "locked on" a large modulated signal, and there are present frequency modulation or amplitude modulation sidebands, or both, the resultant signals driving the motor will not be in general of the same frequency, therefore producing no sustained rotating field. When there is a signal within the spectrum of operation at some frequency other than the one being tracked and not having an equal signal of the same amplitude at an equal distance from the center frequency of the signal being tracked, this signal will appear in each of the two channels driving the motor. Furthermore, the corresponding signals will be in time quadrature with each other in the two channels and will therefore produce a rotating field in the stator of the two-phase synchronous motor 42. The frequency or the rotational speed of the motor will be directly proportional to or identical to the frequency difference between the signal being tracked by the voltage controlled oscillator 34 and the signal that is being referred to it. The rotor of the synchronous motor locks on a signal whose frequency is the difference between the frequency of the first received signal being tracked by the voltage controlled oscillator 34 and a second received signal whose frequency is sufficiently near that of the first received signal that the signals of the difference frequency may pass through the filters 38 and 39. The rate of rotation of the rotor of motor 42 is proportional to or equal to the difference in the frequencies of two received signals.

The rotor 43 of the synchronous motor 42 drives a conventional encoder 44 through an appropriate mechanical linkage. Attached to the mechanical linkage is a conventional damping mechanism labeled damper 45. This mechanism possessing rotational inertia is coupled to the magnet shaft through a viscous coupling and inhibits rapid oscillations while allowing the magnet sufficient speed of response to follow the signals. Manual controls introduced through switch 54 permit the synchronous motor 42 to be locked on target. If the magnet were at rest and a target signal suddenly appeared so that a rotating field were created in the motor stator, the inertia of the magnet might not permit it to accelerate to the point where it would be in step with the rotating field. It is then necessary that the magnet be rotated by hand to get it in step with the rotating field. This operation or its equivalent is common in the art and is sometimes referred to as "manual lock-on".

The equipment composing the target frequency trackers 10 shown in FIG. 6 is composed of a variety of phase-locked oscillators, rotating trackers, and signal elimination circuits which are arranged to process the group of echo signals to obtain the desired information as previously discussed. The signal elimination circuit shown at the top of FIG. 6 is described later herein.

*Signal elimination*

It is often desirable to eliminate a strong signal from a spectrum in order to more easily track the remaining signals in the spectrum. This operation is facilitated by a signal elimination or signal cancelling circuit. A signal from a tracking oscillator is fed into the circuit in such a manner as to cancel the signal being tracked by that circuit. The amplitude of the cancellation signal is controlled automatically so as to be equal to the signal it is desired to cancel. This control of the amplitude is achieved through minimizing the residual or unbalance signal detected after balancing.

A circuit for cancelling or eliminating a single signal from a spectrum is shown at the top of FIG. 6. The "phase locked" oscillator of the target frequency tracker remains in close phase synchronization with the incoming signal as explained elsewhere herein. The output frequency of the oscillator is multiplied in multiplier 46 so that it is just equal to the frequency of the incoming signal. This reference signal so obtained is amplified in amplifier 47 and used as a synchronizing signal for the synchronous detector 48. The signal is further amplified in gain controlled amplifier 49 from whence it is added out of phase with the incoming signal. The residual signal is detected by the synchronous detector 48; and a control signal derived therefrom is passed through low pass filter 50 and used to control the gain of the gain controlled amplifier 49 in such a manner as to minimize the residual or unbalance signal. The output of the combiner 51 is then the entire input spectrum minus all but a very small residual of the signal that is to be eliminated. This circuit tends to cancel nearby signals, both balanced and unbalanced, as well as the main center frequency. The width of the spectrum cancelled and the degree of cancellation are determined by the characteristics of filter 33 in the phase locked oscillator circuit and filter 50 in the automatic gain control of this signal eliminator circuit.

Individual trackers and signals eliminators may be employed together in a variety of configurations, sometimes in parallel and sometimes in tandem. The inevitable degradation of the signal in passing through each circuit indicates that any given tracker should be operated as near as possible to the original signal source with a minimum of circuits in between. The particular arrangement of circuits employed on any target group will depend upon the characteristics of the group. FIG. 6 is merely a sample of such a combination and shows a low frequency rotating tracker driven through the electronic tracker. Another output of the electronic tracker is provided with a signal eliminator for driving succeeding circuits that are tracking signals of lesser intensity. The electronic tracker in this instance tracks the center frequency directly. In one modification of my invention the sidebands are employed for locking on the signal being tracked.

*Signature detection*

The identifying and otherwise informative reflection characteristics of reflecting objects often cause modulation of the echo signals reflected from these objects. Observation of the echo signals detected at the receivers provides a means of monitoring and measuring these reflection characteristics and motions of individual targets and other causes of modulation of the signal. The modulation of the signal caused by the reflection characteristics and motion of a target is called the "signature" of the target. Target signatures and other modulation effects can be shown on either of two displays: a spectrum display and a time display. In the spectrum display amplitudes of the various signals are shown versus their frequencies. This type of instrument is indicated in FIG. 6 and is called a target spectrum analyzer 11. The display using time axis is not shown. When the spectrums of the simultaneous reflections of the signals from several space separated transmitters are examined comparatively for a single target the observations of target signatures is greatly enhanced over those obtainable with single path methods such as radar. A similar advantage accrues to systems employing a single transmitter and multiple receivers. The multiple path methods permit simultaneous view of the target from different reflection angles.

*Miss distance indicator*

In the field of anti-aircraft artillery and anti-missile missiles, there is a requirement for a device that will indicate the distance by which a missile or projectile misses a moving target at which it is aimed or directed. For use with simple missiles and targets moving along ballistic paths the simple distance of closest approach of the missile to the target is satisfactory. As missiles and targets acquire greater performance and better control missile ranges require more detailed information on the relative motion between the target and the missile. Furthermore, on modern ranges it is often desired to test targets and missiles or both without the necessity of mounting equipment on either the target or the missile. In some instances it is desired to have both the target and the missile free of encumbering apparatus. The space and weight required aboard the target and missile are inhibiting factors on their design and performance. There is also a factor of capital expense in employing cooperative equipment on nonrecoverable missiles. Environmental conditions aboard the vehicles such as heat, acceleration, vibration, and radiological conditions sometimes make use of on board equipment difficult. Installation, checkout, and maintenance are other impediments to mounting equipment aboard the missile or aboard the target. When such equipment is to be mounted aboard the target or the missile it is highly desirable for these same reasons that this equipment be as small, light, and simple as possible. There is a further requirement for simultaneous operation with multiple targets or multiple missiles or both.

Polystation Doppler Techniques provide the means for meeting these requirements providing simultaneously the advantages of simplicity and accuracy. The embodiment of my invention to be described is only one of the many variations of my invention suitable for application as a miss distance indicator. The number of stations may be reduced by taking more readings in a given measurement sequence. The methods for accomplishing this reduction of the number of stations is described elsewhere in this specification. Systems may be designed employing small continuous wave transmitters in the target and in the intercepting missile. The particular embodiment of my invention described here requires of the target and the missile only the capability to reflect waves.

In this miss distance indicator, both the target and the intercepting vehicles are illuminated by a continuous wave omnidirectional transmitter. The waves reflected from the target and the interceptor are received at each of a plurality of omnidirectional receiving stations. The exact number of receiving stations employed is determined by the desired mode of operation. At each of the receiving stations the interference signal of the two echos is measured during the interception flight. Readings are taken simultaneously at the various stations. The requirement for a standard frequency oscillator at each receiving station is obviated by using the frequency of one of the echo signals or the approximate frequency thereof as a standard. The freqeuncy of the emissions from the transmitter is controlled by a standard frequency oscillator. The error produced in the measurements of the interference signal by employing the Doppler shifted signals themselves as a frequency standard at each receiving station is insignificant. The only use of the frequency standard thus derived at each of the receiving stations is for determining the duration of the measurements and does not enter into the derivation of the beat or interference signal associated with the two targets. The timing of initiation of the measurement sequence is accomplished by additional communication means between the stations. In a modification of this invention timing is accomplished by modulation of the illuminating signal from the transmitter and appropriate detection of such modulation at the receiving stations.

The determination of the position of the target pair is accomplished by other means such as radar. In this modification of my invention it is only desired to examine that part of the trajectories of the target and the interceptor, constituting the target pair, in which the distance between the target and the interceptor is small compared to the other dimensions of the system, and the position of the pair of reflectors is adequately described by a single set of coordinates.

The positions of the target vehicle and the intercepting missile are calculated using the interference measurements and the data of the position of the pair.

A modification of my invention is evolved by employing only the interference or beat measurements for complete position determination of the two targets without the necessity of separate determination of the position of the target pair. This modification may be employed conveniently in instances where the separation of the targets is sufficiently great that a single position cannot be associated with the target vehicle and the intercepting missile. In this method the measurement equations are expressed in terms of the separate coordinates of each vehicle. A sufficient number of measurements are taken at a sufficient number of receiving stations to determine the positions of the two reflectors. If the separation of the targets is small, one may employ equations of the Type I wherein the group coordinates and the position difference quantities are unknown elements.

In any of the modifications of the miss distance indicator "multiple target motion equations" may be employed as described in patent application Serial No. 278,191.

By obvious expansion of these methods the relative positions of any number of moving objects may be determined.

In one modification of this miss distance indicator the target vehicle carries a continuous wave transmitter. The waves emitting from the target vehicle go directly to a plurality of ground receiving stations and are also reflected by the intercepting missiles from whence they go to the ground receivers.

*Multiple radiating targets*

My invention is applicable to the synthesis of systems in which there is wave radiation from each of a plurality of moving vehicles whose positions it is desired to determine or whose relative positions it is desired to determine. The radiation may be natural, artificial but not cooperative, or intentionally cooperative, and may be pulsed, tone modulated, continuous wave, noise, or other modulated radiation.

In a preferred embodiment of my invention a continuous wave transmitter is carried by each of a pair of aircraft operating in the same vicinity. The assigned frequencies of the two transmitters are sufficiently separated that there is no overlapping of their doppler spectrums at any receiving station in the system, but the frequencies are close enough to permit the use of the same front end and IF amplifier to amplify both signals in the same receiver. At the output of the IF amplifier the cycle count measurements described in this patent application are performed on the signal whose frequency is the difference between the two signals. This measurement of the phase shift occurring between two significant epochs constitutes the individual measurement of the system. The number of stations and the types of equations employed in a given system depends upon the specific mission of the system and the characteristics of the motions of the target vehicles and/or the characteristics of the relative motion between the target vehicles, and upon how closely the freqeuncies of the transmitters in the vehicles are controlled.

If the radiations from each of a plurality of targets is not cooperative such as might be the case with noise emissions or the emissions of hostile communications, the required measurements are performed in a modification of my invention that includes means for the detection of the signals simultaneously by each of a plurality of stations followed by the comparison of the detected signals with each other so that common characteristics of the signals may be identified and the measurements of the differences between the doppler effects may be performed.

*Target groups of constant shape*

When a group of targets is traveling at a rate of speed that is large compared to the speeds of the individual targets relative to each other, the shape of the target group may be regarded as approximately constant for the purpose of determining the positions of the individual targets relative to each other. Under these conditions a fewer number of measurements is required than under more general conditions. A parameter of this ballistic condition is the size of the group, which may be constant, increase linearly with time, or vary according to some other function of time. Discussion of this subject relative to a configuration of two targets has been included in this application and indicated in FIG. 1. There are of course other mathematical methods relative to these configurations. It is to be noted that for the approximation of constant group size and shape that only linear equations of the type I need be employed. In a Unidoppler system only three successive system measurements are required. Each system measurement consists of the measurement of each nonredundant space differential between the targets between two significant epochs. When the approximation is utilized two or more separate Unidoppler configurations simultaneously the accuracy of the approximation is tested by the closeness of the separate calculations of the relative positions of the target using the separate sets of data. The approximation can be employed conveniently for each grouping. When the approximation is employed relative to three separate stations simultaneously for a single simultaneous solution only one system measurement is required—one measurement for each station between the same pair of significant epochs.

*Relative bandwidths of primary and secondary trackers*

One of the advantages of secondary tracking (differential tracking) is that it is possible to employ circuits of different bandwidths for the two separate parts of the operation. As an example assume that a closely packed group of targets is traveling with great velocity and acceleration and that the velocity and acceleration of each of the targets of the group relative to the other targets of the group is minimal. Under these conditions the primary tracker which may be tracking the group of echoes as a whole would have optimal tracking filters of rather broad bandwidth. On the other hand, the secondary tracker which is tracking individual targets relative to the other targets would have an optimum filter that is of a much narrower bandwidth. It is also possible for the opposite condition to obtain. These statements are true for tracking of other parameters than just the Doppler phase shift; the same principles apply for range tracking and for angle tracking of multiple targets.

*Terminal defense system*

An area about the size of a large city may be protected from ballistic missile attack through the use of an embodiment of my invention in conjunction with high performance antimissile missiles. In this embodiment of my invention the system is composed of a plurality of transmitters and a single receiving station and is deployed in the area surrounding the target. Each of the transmitters radiates unmodulated continuous radio waves over a wide solid angle that includes the entire direction of threat. The system operates simultaneously as a surveillance system and as a tracking system. Acquisition of the target is done directly by the phase trackers rather than through the use of a surveillance spectrographic display. Groups of targets such as a hostile ballistic missile and an accompanying group of decoys are acquired by a phase tracker that tracks both the phase and amplitude of the entire signal from the target group. Secondary phase trackers, operating from a two phase output of the group tracker, track the differential signals of the individual targets. Tertiary and quaternary trackers are employed where necessary to discriminate against sideband signals caused by modulation or scintillation of the target echoes.

The receiving station is composed of a plurality of receiving systems composed of interchangeable components. There are a plurality of fixed antenna sensitivity beams achieved either through separate antennas or through an appropriate phased array as is common in the art. Associated with the antenna system is a plurality of apertures so arranged that by comparison of the phases or amplitudes of the signals from these separate apertures it may be determined whether or not echoes from the separate transmitters are being reflected to the receiver from the same target or target group. The directional antenna means so provided also serve to provide information that may be combined with the Doppler information from the phase trackers tracking the signals from one or more of the transmitters to determine the position of the target or target group even though adequate data is not available for a complete determination of position by Doppler means. Such a position determination may be employed directly for tactical use or may be employed as a starting estimate for more accurate iterative solutions based wholly upon Doppler data.

Target groups that are of small dimension may be identified by several methods in addition to that using directional antenna means. The number of targets in the group as indicated by the secondary trackers is one method. Observation of the amplitude of the signal is another method. Other methods of target echo grouping are discussed in this and the referenced patent applications.

In this particular embodiment of my invention the echoes of each transmitter are identified as having been originated at that transmitter by the frequency of the emission from the transmitter. The frequency of each transmitter is separated from that of the other transmitters by an amount somewhat greater than that of the Doppler spectrum.

The more obvious parts of the system such as frequency standards, frequency synthesizers, amplifiers, and control circuits are omitted from this explanation as they have been described in other parts of this application and the referenced applications.

*Tracking section*

The functions of the tracking section are to focus operation of the system on a particular group of targets, to perform Doppler measurements relative to the position and motion of the group, to isolate the echo signals of the individual targets from each other, and to perform measurements of the differential Doppler phenomenon resultant from the positions and motions of the targets of the group relative to each other.

Tracking the combined echo signal of the target group presents no particularly unusual problems in itself. The targets of the group travel nearly parallel courses and are close together. The frequencies of their respective echoes signals are therefore close together in the Doppler spectrum. The combined echo signal from the entire group of targets is phase tracked by a group phase tracker. The more complex part of the tracking mission lies in the requirement of tracking the differential signals relative to the several separate targets. The task is made the more involved by the occurrence of sidebands on the individual target echo signals. Those sidebands are the result of modulation of the echo through variation of the reflective characteristics of the target or through variations of the propagation medium. Unfortunately some of these sidebands contain signals whose frequencies lie within the differential Doppler spectrum of the echo signals of the target group. It is necessary to perform the measurements of the differential Doppler signals in such a manner that the sideband signals are ignored.

Individual targets whose echoes are modulated can be tracked by circuits responsive to the sidebands resultant from the modulation. In this modification of my invention such tracking of signals using the sidebands is accomplished in secondary tracking circuits operating from an output of the group phase tracker. Single unmodulated echo signals are then tracked by means of tertiary trackers adapted to operate on unmodulated signals from outputs of the secondary trackers. In some instances quaternary trackers are employed using outputs of the tertiary trackers.

FIG. 7 is a block diagram of one channel of the tracking section. Tracking is accomplished in successive phase trackers. Each group tracker 71 drives a number of secondary trackers 72, each secondary tracker drives a number of tertiary trackers 73 and so forth. Each tracker additionally provides a counting signal output to one of a bank of counters 74, 75, and 76 which in turn feed a bank of shift registers 77, 78, and 79. The outputs of the shift registers are fed to the computer 80. The shift registers also receive "readout command" from the computer and "time of day" signals from a system timer not shown. The circuits between successive trackers are two phase circuits. Only the group tracker 71 is driven from a signal phase circuit. The two phase circuits permit operation of the various secondary, tertiary, and quaternary trackers directly at the differential signal frequency and without the necessity of a bias frequency for the purpose of sense indication. Sense indication is provided by the direction of rotation of the signal in the two-phase circuit. The two-phase coupling and operation of the trackers provides a method of discriminating against sideband signals.

While a system of circuits is shown for tracking analog signals, measuring their Doppler variations and preparing the data for introduction to the computer, it is a perfectly practical modification of my invention to employ digital techniques for this entire process. The data processing is initiated with a sampling operation performed at the output of the IF channel. Somewhat greater speed and flexibility is offered by this computer type of method.

*Group tracker with two phase output*

FIG. 8 is the block diagram of a circuit that tracks the phase and amplitude of total Doppler signal of a target group which circuit may be employed as the group tracker 71. The circuit receives as its input the relatively low frequency signal from the second IF amplifier of the receiver. The bandwidth of the input signal includes the entire Doppler spectrum. There are three outputs. The first is the signal output of the voltage controlled oscillator 81. This is the signal whose net phase change is measured by the counting circuits to determine the net change in propagation distance occurring between two significant epochs. The second output signal is the automatic gain control signal which is employed to indicate the net signal power of echoes of the target group that is being tracked. The third output is the two phase output signal resultant from the differential Doppler effect associated with the motion and position of the individual targets relative to the motion and position of the target group.

The operation of the group tracker briefly is as follows. The input is presented to an automatic gain controlled amplifier 82. The output of the amplifier is fed to two synchronous detectors 83 and 84. These synchronous detectors are fed synchronizing signals from the voltage controlled oscillators 81 nintey degrees out of phase with each other. The phase quadrature is obtained by imposition of the phase shifter 89 in the synchronizing signal lead to the synchronous detector 83. The outputs of the synchronous detectors are fed to low pass filters 85 and 86 as indicated. It is one purpose of these filters to remove the higher unwanted modulation products from the signal. A second purpose of the filters 85 and 86 is to restrict the two phase output of the group tracker to that part of the total Doppler spectrum occupied by the echoes of the target group. The output of filter 85, in addition to constituting one of the phases of the two phase output, is fed through filter 87 to the voltage controlled oscillator 81. A phase locked loop is thus formed. In this circuit the voltage controlled oscillator 81 operates directly at the IF frequency of the receiver. Consequently, the control circuit must have a direct current capability. Part of the signal from the other phase of the two phase output signal obtained from filter 86, is fed through filter 88 to the automatic gain control terminal of AGC amplifier 82. The filters 87 and 88 determine the tracking characteristics of the group tracker.

A simple sine wave signal at the input of the group tracker that is higher in frequency than that of the voltage controlled oscillator 81 will be evidenced by a phase rotation in the two-phase output that is in one direction and equal in rate to the frequency difference between the input signal frequency and the frequency of the oscillator. A signal at the input that is lower than the frequency of the oscillator 81 will result in a signal at the two-phase output that has the opposite direction of rotation from the rotation associated with the input signal that is higher in frequency than that of the oscillator. Thus the frequency of the two phase output signal is equal in magnitude to the absolute value of the difference in the frequencies of the input signal and the oscillator signal, and the direction of rotation indicates the sense of the frequency separation.

*Secondary and tertiary tracker*

FIG. 9 is a block diagram of a secondary tracker and a tertiary tracker with a two phase connection between them. The input of the secondary tracker is obtained from the two-phase output of the group tracker and is applied to synchronous detectors 91 and 92. Since the input of the signal being tracked is a two-phase signal the signal input to one of the synchronous detectors is ninety degrees out of phase with the signal input to the other of the synchronous detectors. Therefore the synchronizing signals of the tracking signal applied to these synchronous detectors are in phase with each other and are in fact drawn directly from the same output of the voltage controlled oscillator 93. Other than for this minor difference the circuit of the secondary tracker is the same as that of the sideband type of tracker previously described in this application. The outputs of the synchronous detectors 91 and 92 are applied to the inputs of the band pass filters 94 and 95 respectively. These filters must be sufficiently broad to pass the spectrums of all nearby signals which it may be desired to track with the tertiary and succeeding trackers. The outputs of the filters 94 and 95 each form one phase of the two phase output signal of the secondary tracker. Parts of these outputs are also fed to the synchronous detector 96 whose output, fed through low pass filter 97, controls the frequency of the voltage controlled oscillator 93.

The tertiary tracker is much the same as the secondary tracker with the exception that it is capable of tracking an unmodulated differential signal input. The two phase signal input is also supplied to synchronous detectors 98 and 99 which receive inphase synchronizing signals from the voltage controlled oscillator 100. The outputs of the synchronous detectors 98 and 99 are fed to low pass filters 101 and 102 whose outputs form the two phase output of any succeeding tracker and are also fed to the multiplier 103, whose output controls the frequency of the voltage controlled oscillator 100 through the low pass filter 104. The tertiary tracker has a direct current capability to permit it to track simple unmodulated signals.

In operation several different tertiary trackers operating from different secondary trackers might be tracking the same signal. This occurrence is immediately observable in examination of the various counting results, which operation is carried on in the computer. The only disadvantage of such operation is the loading of the equipment with unnecessary tracking. The essential thing is of course to be certain that all signals are tracked and measured.

It is apparent that there is a wide variety of variations and orders in which the various trackers can be arranged and operated. For instance a sideband type tracker could be used as the primary tracker to track a single modulated target that is of exceptional strength. The two phase output of this tracker would be suitable to drive the secondary trackers. The tertiary tracker described above can be used similarly.

In another modification of my invention all of the trackers operate in sequence, each tracker locking on a separate target, sequentially in time and circuit, from the output of the preceding tracker.

Any tracker and its associated counter operating from the output of a preceding tracker performs a measurement of the differential Doppler phenomenon on the signal it is tracking. The measurement is performed relative to the signal being tracked by the preceding tracker, that is, using the signal tracked by the preceding counter as a reference Suitable addition and subtraction of the measured values are performed as necessary and indicated to derive the data for use with the equations as described elsewhere in this and the referenced patent applications. This operation is performed by the computer.

*Digital operation*

All of the signal processing operations described in this application may be accomplished by digital methods programmed on conventional computers. In this modification of my method the data reduction is initiated at the output of the I. F. amplification by suitable detection and sampling of the signal, and all the indicated processes are carried on thenceforth by computing methods instead of with the tracking and counting devices described herein.

The computer can be programmed to extend the tracking capabilities of the system through adaptive filtering techniques, ref. C. S. Weaver IRE Transaction International Symposium on Information Theory, Brussels, Belgium, September 1962, and other similar techniques some of which are described in the same papers.

*Alternative phase tracking system*

It is possible to track the separate echos of a group of reflecting objects directly without the interposition of a group tracker. In such operation the primary trackers operate directly from the intermediate frequency output of the receiver or directly from the amplified output of the antenna. In this case the existing sidestepping technique is employed to avoid the problems of sense determination. A fixed bias value may be included in the count of the primary counter later to be subtracted from the measurement by the computer or the bias may be removed by appropriate mixing of the count signal output of the tracker output with suitable bias signals. The primary tracker itself always tracks a signal without sense indication. The difference between the measured count derived from the signal and the bias quantity is the algebraic value of the measurement. A practical method of avoiding confusion with the sidebands created by reflection modulation of some of the targets is to employ the sidebands as a means of primary tracking of the individual modulated signals and tracking the unmodulated signals with secondary trackers operating from the outputs of the primary trackers. If all of the reflected signals were modulated there would appear to be no need for any secondary or tertiary trackers. However, it might be desirable under some conditions to employ a second sideband type tracker or even a simple carrier type tracker to track a modulated signal at the output of a primary sideband type tracker. This method may be desirable in cases of mutual interference of the signals. A redundancy of tracking equipment may be brought to bear in such instances to aid in sorting out the echos of the various targets.

FIG. 10 is a block diagram showing a primary sideband type tracker feeding a secondary tracker that may be either of the sideband tracking type or may be of a type designed to track only a simple unmodulated signal. Sense indication is provided in the circuit of the secondary tracker which tracker operates from the two-phase output of the primary tracker. The secondary tracker also provides a two-phase output for the operation of a succeeding tertiary tracker. The sideband type of tracker is descibed by J. P. Costas, Proceedings of the I.R.E., December 1956. The circuit employed here as the primary tracker is similar to the circuit described by Costas.

In FIG. 10 the primary tracker shown at the top of the drawing is operated directly from the bus from the output of the intermediate frequency amplifier such as may be provided in receiver 2 shown in FIGS. 2 and 3. Several other primary trackers tracking other targets will also operate from the same bus. The bus may be driven at the received radio frequency from the antenna 5 through an amplifier if more convenient. The input from the bus 110 is fed to synchronous detectors or mixers 111 and 112. The outputs of these detectors contain signals of the modulation frequencies. These signals are passed by band pass filters 113 and 114 to the synchronous detector 115, from which a control signal is derived. The control signal is applied through low pass filter 116 to the voltage controlled oscillator 117. The voltage controlled oscillator drives the phase splitter 118 which has two output signals at the nominal frequency of the signals from the bus 110. These signals from the phase splitter 118 are ninety degrees out of phase with each other and have a fixed phase sequence. There is no problem of sequence reversal since the primary tracker only operates in one direction. The outputs of the voltage controlled oscillator 117 are fed as a synchronizing or mixing signals to the detectors 111 and 112. One of the outputs is also fed to a cycle counting means. The output of the cycle counting means is then the biased measurement performed on the modulated echo signal being tracked by the primary tracker. The outputs of the filters 113 and 114 are also fed to two buses 119 and 120 and constitute the bidirectional two-phase output of the primary tracker.

The two-phase bidirectional output of the primary tracker feeds several secondary trackers by buses 119 and 120. One of these secondary trackers is shown in the lower half of FIG. 10. Depending upon the characteristics of the filters and the synchronous detectors or multipliers employed, the circuit may be designed to track either single frequencies or to track sidebands in the manner of the primary circuit shown in the upper part of FIG. 10. The total secondary tracker is composed of two subcircuits, the tracking circuit comprising the two inside arms and the sense determining circuit comprising the two outside arms. The two-phase signal from the primary tracker is fed to the synchronous detectors 121 and 122 for the tracking portion of the circuit and synchronous detectors 123 and 124 for the sense determining portion of the circuit. The outputs of the synchronous detectors 121, 122, 123, 124 are fed to identical filters 125 and 126 of the tracking portion of the circuit and filters 127 and 128 of the sense determining portion of the circuit. These filters are band pass filters if it is desired that the tracker only track modulated signals. These filters are low pass filters if the tracker is to track unmodulated signals. The outputs of the filters 125 and 126 are fed to synchronous detector or multiplier 129. If the circuit is to track unmodulated signals the element 129 must be capable of multiplying the direct current output signals from the filters 125 and 126. Similarly, synchronous detector or multiplier 130 is fed signals from filters 125 and 127, and synchronous detector or multiplier 131 is fed signals from filters 126 and 128. Similar statements apply to elements 130 and 131 as apply to element 129, and these are identical elements. The output of the synchronous detector or multiplier 129 is passed through low pass filter 132 to control the frequency of the voltage controlled oscillator 133. This oscillator feeds phase splitter 134 which provides two output signals at the center frequency of the signal from the buses 119 and 120 that is being tracked by the trackers. The signals are ninety degrees out of phase with each other and have a fixed phase sequence. These signals are applied to the synchronous detectors 121, 122, 123, 124. The outputs of the synchronous detectors or multipliers 130 and 131 are employed to control gates 135 and 136 respectively. If the tracker is to track modulated signals, it may be necessary to introduce low pass filters between the elements 130 and 131 and the gates 135 and 136. A pulse signal derived from the voltage controlled oscillator through pulse former 137 is also applied to each of the gates 135 and 136. The same signal is applied to both gates. When the sequence of the signal being tracked has one sense, one of the gates is actuated so as to pass the pulses. When the sequence of the tracked signal is in the opposite sense, the other gate is opened and the first gate remains closed, thereby producing an algebraic signal for the operation of a bidirectional counter. The outputs of filters 125 and 126 are also fed to buses 138 and 139 for use as the input signal for succeeding tertiary trackers.

The function of the phase splitters 118 and 134 provide two outputs at the same frequency as its input, which two outputs are ninety degrees out of phase with each other. Phase spitters of this type are described in the following references: "Properties of Some Wide-band Phase Splitting Networks" by David G. C. Luck, Proceedings of the I.R.E., February 1949; D. K. Weaver, Jr., Proceedings of the I.R.E., April 1954, "Design of RC Wide-Band Ninety Degree Phase-Difference Network"; R. S. Dome, Electronics, December 1945, "Wideband Phase Shift Network."

It should be noted here that should wide normalized bandwidth be desired in the circuit shown in FIG. 6, such a wide band phase splitter should be employed between the voltage controlled oscillator 34 and the synchronous detectors 32 and 36 replacing the single phase shifter 37.

It may be unnecessary to point out that when direct primary tracking of the incoming signal or the intermediate frequency signal, the frequency or the phase change readings of the tracker tracking each echo so tracked may be subtracted from the frequency or phase change readings of other primary trackers tracking other targets of the group. Thus the differential data required in some of the methods of computation described in this application is directly obtainable. The subtraction process may be accomplished instrumentally prior to the data processing and computation or the subtraction may be accomplished in the computer.

Sideband tracker with sense reversal in output

The circuit shown in FIG. 11 employs elements shown in FIG. 9, and these are designated by the same reference numerals. The filters 94 and 95 are of the band pass variety to pass the demodulated sideband signals and to prevent transmission of a direct current signal. Thus the tracker shown in FIG. 9 is able to track modulated signals but unable to track unmodulated signals of a single frequency. These filters in the secondary tracker also prevent a following tertiary tracker from tracking continuously from one side to the other through the spectrum surrounding the center frequency of the modulated signal being tracked by the secondary tracker. As the frequency of the signal being tracked by the tertiary tracker approaches and passes through the frequency of the signal being tracked by the secondary tracker, the corresponding frequency actually fed to the tertiary tracker from the primary tracker approaches zero and then increases with opposite rotation. However, as the signal approaches zero, it is attenuated to zero amplitude by the band pass filters 94 and 95. This condition does not exist in the circuit shown in FIG. 11 which circuit may be substituted for the secondary tracker shown at the top of FIG. 9 when it is desired to track signals passing through the center frequency of the signal being tracked by the secondary tracker. In the event that it is desired for the tertiary tracker to track through the zero and into reversed phase rotation, it is only necessary to couple the tertiary tracker through low pass filters 140 and 141 directly to the outputs of synchronous detectors 91 and 92. The band pass filters 94 and 95 are still required to pass demodulated sideband signals to the synchronous detector 96 for normal tracking operation of the secondary tracker itself. A similar arrangement may be provided to the top portion of the circuit shown in FIG. 10, that is, low pass filters such as 140 and 141 may be used to couple the outputs of synchronous detectors 111 and 112 to the two-phase output lines 119 and 120 instead of connecting the outputs of filters 113 and 114 to these lines.

Machine computation

Where, in an application or modification, of my invention it is desired to automate the computation procedure, either to reduce the human effort or to speed the process of the calculation, the general purpose digital computer finds the most facile adaption to the purpose. This type of machine may be coupled directly to the sensing apparatus or data may be fed into it through magnetic tape, punched tape, cards or a wide variety of input mechanisms such as shift registers. The IBM 7090 computer is such a general purpose digital machine, and a wide variety of peripheral equipment is readily available for almost any computer application. There are many other firms also offering such equipment.

While I have shown a preferred embodiment of the invention it will be understood that the invention is capable of variation and modification from the form shown so that its scope should be limited only by the scope of the claims appended hereto.

What I claim is:

1. A method of determining the position of each moving object of a group of such moving objects relative to other objects of the group comprising the following acts:
   (1) establishing a set of reference points separated from each other by distances large compared to the dimensions of the target group;
   (2) ascertaining the positions of the said reference points at each of a set of significant epochs;
   (3) ascertaining the position of the group of moving objects relative to the positions of the reference points at each of the said significant epochs;
   (4) measuring changes occurring in geometrical relationships between the positions of said moving objects and the positions of said reference points, said changes occurring between said epochs and each said relationship embracing the positions of two or more of said moving objects;
   (5) computing the positions of the moving objects relative to each other using the information supplied from the above steps by solving a set of simultaneous equations, said set comprising as known quantities the values of the quantities measured in (4).

2. A method of determining the position of each moving object of a moving group of such moving objects relative to other objects of the group comprising the following acts:
   (1) establishing a reference point of known position in the immediate vicinity of the group, which reference point may be one of the objects comprised by the group;
   (2) performing Doppler measurements relative to the moving objects forming the group, said reference point and a system of stations of known geometrical disposition, each of said measurements being dependent upon the motions of two or more of said moving objects relative to each other;
   (3) computing from the data acquired in (1) and (2) the relative positions of each of the moving objects of the group relative to the other moving objects of the group by solving a set of simultaneous equations, said set comprising as unknown quantities the dimensions of the relative positions of said moving objects.

3. A method of determining the position of each moving object of a moving group of such moving objects relative to other objects of the group comprising the following acts:
   (1) establishing a reference point in or near the group, the position of which point is known and which reference point may be one of the objects of the group;
   (2) determining by Doppler observations the differences of changes in the lengths of the propagation paths of waves transmitted from a system of fixed stations, reflected by the moving objects, and received by the system of fixed stations, each measurement being performed using a single transmitting means and a single receiving means;
   (3) computing from the data acquired in (1) and (2) the relative positions of each of the moving objects of the group relative to the other moving objects of the group by solving a set of simultaneous equations, said set comprising as unknown quantities the dimensions of the relative positions of said moving objects.

4. A method of determining the relative positions and the relative motions of a plurality of moving objects forming a compact group having substantial translational motion comprising the following acts:
   (1) illuminating the group of moving objects by wave transmitting means;
   (2) detecting the waves reflected by the moving objects by suitable receiving means;
   (3) ascertaining the positions of all of the transmitting and receiving means employed in (1) and (2) at each of a series of separate epochs;
   (4) ascertaining the position of the group of moving objects at each of the said separate epochs;
   (5) performing a series of Doppler observations relative to the moving objects and the wave transmitting means and wave receiving means, each said measurement being dependent on the motions of at least two moving objects relative to each other;
   (6) computing from the information derived from the above acts the positions of the various moving objects relative to each other at each of said epochs by solving a set of simultaneous equations comprising as unknown quantities the dimensions of the relative positions of said moving objects.

5. A method of determining the relative positions and the relative motions of a plurality of moving objects forming a compact group having substantial translational motion, comprising the following acts:
(1) illuminating the group of moving objects by wave transmitting means;
(2) detecting the waves reflected by the moving objects by suitable receiving means;
(3) ascertaining the positions of all of the transmitting and receiving means employed in (1) and (2), at each of a series of significant epochs;
(4) ascertaining the position of the group of moving objects at each of the said significant epochs;
(5) determining the differences in the changes of the range sums occurring between the significant epochs relative to the various moving objects and the various receiving and transmitting means;
(6) computing from the above information the positions of the various moving objects relative to each other at each of the said significant epochs by solving a set of simultaneous equations comprising as unknown quantities the dimensions of the relative positions of said moving objects at said epochs.

6. A method of determining the position of each reflector of a group of moving reflectors comprising the following acts:
(1) illuminating the entire group of reflectors by each of one or more wave transmitters whose position is known;
(2) detecting the waves returned by the reflectors at each of one or more receivers whose position is known;
(3) Generating a reference signal at the receiving means which simulates the signal that would be derived from a large spherical reflector within the group of reflectors;
(4) ascertaining the position of the phantom reflector;
(5) observing differences in the doppler phenomenon relative to each of the moving reflectors and the phantom reflector;
(5) observing differences in the Doppler phenomenon relative to each of the moving reflectors and the phantom reflector;
(6) computing the positions of the moving reflectors from information derived from the above acts by solving a set of simultaneous equations, said set comprising as unknown quantities the dimensions of the positions of said moving objects and comprising as known elements the values of the quantities measured in (5) and the dimensions of the positions of the phantom reflector ascertained in (4).

7. A method of determining the position and motion of each of two or more moving reflectors of waves forming a closely spaced group with translational motion comprising the following acts:
(1) illuminating the entire group of reflectors by each of one or more wave transmitters of known position;
(2) detecting the waves returned by the reflectors at each of one or more receivers whose position is known;
(3) generating a phantom echo or reference signal which simulates the signal of a large spherical reflector traveling with the group of moving reflectors;
(4) ascertaining the coordinates of the phantom reflector,
(5) determining the changes in the difference between the propagation path from a transmitter to a moving reflector to a receiver and a similar path relative to the phantom reflector, and performing this act for each of the various transmitter-receiver-reflector combinations;
(6) computing the position and motion of the moving reflectors from the data derived from the above acts by solving a set of simultaneous equations, said set comprising as unknown quantities the dimensions of the positions of said moving objects and comprising as known elements the values of the changes measured in (5) and the dimensions of the positions of the phantom reflector ascertained in (4).

8. A method of determining the positions of each of a plurality of moving targets forming a closely spaced group of such targets relative to other objects of the group comprising the following acts:
(1) Determining by separate means the position of the group of moving objects,
(2) Illuminating the entire group of objects by each of a plurality of radio transmitters whose radiant energy is directed toward the group by directional antenna means, said antenna means being pointed at the target group using information supplied in (1),
(3) Detecting the waves reflected from the target objects at a single receiving station employing a directional antenna which is pointed at the target group using information supplied in (1),
(4) Ascertaining the positions of all of the transmitting stations and the receiving stations,
(5) Measuring relative to each of the illuminating transmitters the differences in the Doppler phenomenon resultant from the motions of the moving objects,
(6) Associating the various signals to form groups of signals, each group of signals corresponding to a single target object, (resolving signal ambiguity), by employing monopulse directional means of the receiving antenna to determine that the signals from the various transmitters are being reflected by the same targets object,
(7) Computing from the information derived the positions of each of the target objects relative to the other target objects of the group of target objects by solving a set of simultaneous equations, said set comprising as known elements the values of the differences measured in (5).

9. A method of determining the positions of each of a plurality of moving reflecting targets forming a geometrically small group of such targets relative to other targets of the group comprising the following acts:
(1) Determining by separate means the position of the group of targets,
(2) Illuminating the entire group of objects by a single radio transmitter,
(3) Detecting the waves reflected by the targets at a single receiving station,
(4) Ascertaining the positions of the transmitter and the receiving station,
(5) Determining the differences in the Doppler phenomenon resultant from the motions of the moving objects,
(6) Computing from the information derived above the position of each of the targets relative to the other targets by solving a set of simultaneous equations said set comprising as known elements the values of the differences determined in (5).

10. A method of determining the position of each of a plurality of moving reflecting targets in a geometrically small group of such targets employing only a single tracking position and comprising the following acts:
(1) Acquiring and tracking the group of targets by conventional radar means at the tracking station,
(2) Detecting and measuring the differences in the Doppler phenomenon relative to the radar echoes from the several targets,
(3) Computing from the information acquired above the position of each of the targets relative to the other targets of the group by solving a set of simultaneous equations, said set comprising as known elements the values of the quantities measured in (2) and comprising as unknown elements the dimensions of the relative positions of the moving objects.

11. A method of determining the position of each of a plurality of moving reflecting targets in a geometrically small group of such targets comprising the following acts:
(1) Determining by separate means the position of the group of targets,
(2) Illuminating the entire group of targets by a single radio transmitter,
(3) Detecting at a single receiving station the waves reflected by the targets,
(4) Ascertaining the positions of the transmitter and the receiving station,
(5) Determining changes in the differences of the lengths of the wave propagation paths relative to the various targets of the group occurring between significant epochs from observations of the Doppler phenomenon at the receiving station,
(6) Computing from the information derived as described above the position of each of the targets relative to the other targets of the group at any of the significant epochs by solving a set of simultaneous equations, said set comprising as unknown quantities the dimensions of the position of the moving objects at all of said epochs and comprising as known quantities the changes determined in (5).

12. A method of determining the position of each of a plurality of moving reflecting targets in a geometrically small group of such targets comprising the following acts:
(1) Determining by separate means the position of the group of targets,
(2) Illuminating the entire group of targets by a single ratio transmitter,
(3) Detecting at a single receiving station the waves reflected by the targets,
(4) Ascertaining the positions of the transmitter and the receiving station,
(5) Observing of the Doppler phenomenon at the receiving station and determining changes in the differences of the lengths of the wave propagation paths relative to the various targets of the group occurring between several significant epochs,
(6) Ascertaining characteristics of the motion of the targets relative to each other owing to physical forces,
(7) From the results of (6) writing equations relating the positions of the several targets at the various significant epochs to each other,
(8) Writing equations relating the measurements performed in (5) to the relative positions of the targets at the several significant epochs,
(9) Solving the equations of (7) and (8) simultaneously to obtain the position of each of the targets relative to the positions of the other targets of the group at any of the said significant epochs.

13. A method of determining the position of each of a plurality of wave radiating targets relative to each other comprising the following acts:
(1) Establish a plurality of receiving equipments at separated receiving sites,
(2) Detecting the signals from the emitting targets at each of said receiving sites and performing measurements of the differences of the Doppler effects of the received signals,
(3) Computing from the measured data the positions of the emitting targets relative to each other by solving a set of simultaneous equations, said set comprising as known elements the values of the quantities measured in (2) and comprising as unknown elements the dimensions of the differences of the positions of the moving objects.

14. A method of determining the change of phase occurring in a given time interval between two signals simultanously present at a single terminal, comprising the following steps:
(1) Tracking either of said signals by phase locked tracking means,
(2) Detecting the other signal in a mixer using the large constant amplitude output signal of the phase locked tracking means as the injection signal,
(3) Filtering the output of said mixer to gain a signal whose frequency is the difference between the two frequencies of the two initial signals,
(4) Measuring the phase shift of the signal output of the filter of (3) occurring in the given time interval to obtain the desired phase shift between the two initial signals.

15. A method of determining the position of each target of a group of moving targets, from which waves are diverging, relative other targets of the group comprising the following acts.
(1) Tracking the target group at one or more sites by means sensitive to the divergent waves,
(2) Measuring at each of said sites the differences in the Doppler phenomenon relative to the several targets,
(3) From the information derived above computing the relative positions of the targets by solving a set of simultaneous equations, said set comprising as known elements the values of the quantities measured in (2) and comprising the dimensions of the relative positions of the moving objects as unknown elements.

16. A method of determining the positon of each of a plurality of moving target objects relative to each other comprising the following acts:
(1) Mounting in one or more of the objects a transmitter and transmitting waves to distant receiving means and also illuminating one or more of the other moving objects in such a manner that the waves from the illuminated moving objects are received also by said distant receiving means,
(2) Receiving the direct and reflected waves at a plurality of separated distant receiving means,
(3) Determining at each receiving site changes in the geometrical relationships between the moving objects and the receiving positions by observing changes in the relative phases of the received signals,
(4) Computing the positions of the moving objects relative to each other by using the data derived by solving a set of simultaneous equations, said set comprising as known elements the values of the changes determined in (3) and comprising the dimensions of the relative positions of the moving objects as unknown elements.

17. A method of determining paths of an intercepting missile relative to a target vehicle comprising the following acts:
(1) Placing aboard the target vehicle a transmitter and transmitting waves therefrom to illuminate the intercepting missile in addition to a plurality of distant receiving stations,
(2) Detecting at each of the said receiving stations the direct emissions from the target vehicle and the waves reflected from the intercepting missile,
(3) Observing the signals received at the several receiving stations and determining changes in the geometrical relationships between the target vehicle, the intercepting missile, and the receiving stations occurring between significant epochs, which significant epochs may be as close together as desired,
(4) Determining the position of the target vehicle at said significant epochs by tracking means,
(5) Computing from the data derived from the above steps the positions of the missile relative to the target vehicle at each of the significant epochs thereby obtaining the motion of the intercepting missile relative to the target vehicle said computing being performed by solving a set of simultaneous equations said set comprising as known elements the values of the changes determined in (3) and the dimensions of the positions determined in (4) and comprising as unknown elements the dimensions of the position of said intercepting missile relative to said target vehicle at each of said epochs.

37

18. A method of determining the position and motion of each of a group of closely spaced moving target objects comprised of the following acts:
(1) Illuminating the group of targets by a plurality of wave transmitters,
(2) Detecting the signals reflected from the targets at one or more receiving sites,
(3) Measuring at each receiving site the differences in the Doppler frequencies associated with the moving targets,
(4) Determining the position of the target group by other tracking means,
(5) Computing, from the data acquired above, the position and motion of each of the targets with respect to the other targets of the group by solving a set of simultaneous equations said set comprising as known elements the values of the quantities derived from the measurements performed in (3) and the dimensions of the position determined in (4) and comprising as unknown elements the dimensions of the relative positions of said moving objects.

19. A method of determining the position and motion of each target of a closely spaced group of moving reflecting targets relative to other targets of the group comprising the following acts:
(1) Illuminating the group of targets by a plurality of wave transmitters substantially separated from each other in space,
(2) Making the illuminating signal of each wave transmitter different from the signals of the other wave transmitters in such a manner that the signal from each transmitter may be identified as coming from that particular transmitter,
(3) Detecting signals reflected from the target group at a single receiving station,
(4) Identifying the reflected signals from each transmitter as coming from that particular transmitter by means sensitive to the identification of the transmitted signals provided in (2),
(5) Measuring the differences in the Doppler shifts of the signals reflected from the various targets by observing the signals from each transmitter detected by said receiving station,
(6) Computing from the data collected the position and motion of each of the targets relative to the positions and motion of the other targets of the group by solving a set of simultaneous equations, said set comprising as unknown elements the dimensions of the positions of said targets relative to each other.

20. A method of determining the position and motion of each target of a closely spaced group of moving reflecting targets relative to other targets of the group comprising the following acts:
(1) Illuminating the group of targets by a wave transmitter,
(2) Detecting the signals reflected from the targets at each of a plurality of space separated receiving stations,
(3) Measuring the differences of the Doppler effects of the signals reflected from the various targets by observing the signals detected at each receiving station,
(4) Computing from the data collected in (3) the position and motion of each of the targets relative to the positions and motions of the other targets of the group by solving a set of simultaneous equations, said set comprising as known elements the values of the quantities measured in (3).

21. A method of tracking the phase difference between two signals of different frequencies appearing at the same terminals comprising the following acts:
(1) Feeding the said two signals together into mixing means, generating a large injection signal and applying said injection signal to said mixing means,
(2) Deriving a regulating signal from the output of said mixing means and controlling the frequency of the generator providing the injection signal therewith,
(3) Applying the regulating signal derived in (2) to the generator providing the injection signal in such a manner that the frequency of the injection signal is regulated to result in the magnitude of the regulating signal being a minimum thus causing the frequency controlled generator to track the frequency of one of the said two signals first applied to the mixing means in (1),
(4) Filtering and feeding the output of the mixing means into a secondary phase tracking circuit which tracks the frequency difference between said two signals.

22. A method of tracking the phase difference between the center frequency of a modulated signal and a nearby unmodulated signal appearing at the same terminals comprising the following acts:
(1) Tracking the phase of the center frequency of the modulated signal by means of a phase tracker sensitive only to modulated signals which phase tracker provides a polyphase signal output whose phase rotation is the same as that of the difference in the phases of the said modulated signal and the said unmodulated signal,
(2) Tracking the polyphase output signal of the phase tracker described in (1) by means of a secondary phase tracker responsive only to unmodulated polyphase signals, the phase of this secondary tracker then remaining the same as the phase difference between the phases of the said modulated signal and the said unmodulated signal.

23. A method of determining the sense of rotation or the polarity of the sequence of a polyphase signal comprising the following acts:
(1) Tracking the polyphase signal with a polyphase tracking filter having a phaselocked oscillator,
(2) Feeding the output signal from the oscillator of the tracking filter to a phase splitting network to obtain a polyphase synchronizing signal whose sequence has a constant polarity,
(3) Applying the polyphase synchronizing signal developed in (2) and the polyphase input signal to means sensitive to the similarity or opposition of the polarities of the phase sequences of the two signals, the output of which means indicates the said similarity or difference of phase sequence.

24. A method of detecting the echo signals reflected by a group of moving objects illuminated by an electromagnetic continuous wave transmitter in the presence of modulation sidebands caused by variation of the reflection characteristics of the reflecting objects, comprising the following acts:
(1) Tracking each of the modulated signals of the group using tracking filter means having a phase locked oscillator, said filter means being only responsive to the sideband pairs of modulated signals and being insensitive to unmodulated signals,
(2) Deriving a polyphase signal from the output of the oscillator of the tracking filter of (1),
(3) Applying the signal input to the system to each of a plurality of mixers or synchronous detectors there being one such mixer or synchronous detector for each phase of the polyphase signal derived from the oscillator of the tracking filter,
(4) Applying one phase of the polyphase synchronizing signal derived in (2) to one of the mixers or synchronous detectors of (3) so as to obtain a polyphase signal spectrum, the signals of the input spectrum whose frequencies are higher than the frequency of the oscillator of the phase tracker described in (1) providing a signal of one sequence polarity in the polyphase signal spectrum and signals whose frequencies are less than the said oscillator frequency providing polyphase signals of the opposite sequence polarity, the frequency of each polyphase signal being equal to the difference between the frequency of the input signal and the frequency of the oscillator of the tracking filter described in (1), (5) Tracking each of the polyphase signals derived in (4) separately and detecting the sense or polarity of its sequence.

25. A method of determining the relative positions of a closely spaced group of moving reflecting objects, some of which reflecting objects possess irregular shapes and tumbling motions so that there is modulation of the reflected energy caused thereby, comprising the following acts:

(1) Illuminating the group of targets by a plurality of electromagnetic continuous wave sources, (2) Detecting the reflected electromagnetic energy at one or more receiving stations, (3) Phase tracking the modulated echo signals with tracking means sensitive to the sidebands produced by the modulation, (4) Employing the controlled frequencies of one or more of the phase trackers tracking modulated signals as reference signals generate signals whose frequencies are the algebraic differences between the said derived reference signals and other modulated or unmodulated signals, (5) Phase tracking the signals generated in (4) maintaining a constant indication of the sense of the signals, (6) Measuring the changes of phase between each of the phase trackers and the signals of local frequency standards, (7) Computing the positions of the various targets using the data collected in (6) by solving a set of simultaneous equations, said set comprising as known elements the values of the changes measured in (6).

26. A method of performing simultaneously with a single electronic system in an assigned volume of space the following military electromagnetic missions:

(1) *surveillance*—to detect the presence of any moving reflecting object located in or appearing anywhere at any time in an assigned volume of space, (2) *tracking*—to determine the position and motion of all moving reflecting objects in an assigned volume of space with any required continuity, (3) *decoy discrimination*—to accurately determine the position and motion of each reflecting object to a group of such objects relative to other objects of the group, (4) *signature detection*—to detect and identify reflecting characteristics of objects being tracked so as to obtain information as to the structure and motion of the target object, said method comprising the following acts:

(1) Illuminating the assigned space volume with unmodulated continuous wave electromagnetic radiation from a plurality of space separated transmitters each of whose beams is fixed and so adjusted that the entire surveillance volume is covered by the beam, (2) Making the illuminating signal of each transmitter of a different frequency from that of the other transmitters so that signals originally emanating from that transmitter can be identified by a receiving apparatus as originating at the said transmitter, (3) Detecting the signals reflected from moving target objects at a single receiving station whose nonscanning antenna means are fixed physically and electrically and in such a manner that the entire surveillance volume is covered continuously, (4) Identifying at the receiving station of (3) the reflected signals originating from each transmitter as coming from the said transmitter by means sensitive to the differences in the frequencies assigned to the various transmitters, (5) Measuring the Doppler effect upon the reflected signals arriving at that station from single moving reflecting objects and moving groups of such objects by observing the signals detected at the receiving station of (3), (6) Using the data collected in (5) computing the position and motion of individual moving reflecting objects and moving groups of such objects, (7) Measuring relative to selected moving groups of targets tracked in (6) the differences, within each group so tracked, of the Doppler effect of the signals reflected by the various targets of the group and originating from each transmitter, (8) Computing the position and motion of each object within each group of objects so tracked relative to the other objects of the group using the data collected in (7), (9) By minutely examining the entire Doppler spectrum of the signals transmitted by each transmitter, reflected by the targets, and detected at said receiving station, maintaining a posture of alertness to the occurrence of new signals in the Doppler spectrums of the signals from each transmitter, thereby becoming quickly aware of the incidence, intrusion or appearance of a new moving reflecting object in assigned surveillance volume of the sensor system,

(10) Maintaining by frequency tracking means a spectrum analyser centered on the spectrum of any modulated signal of interest for the purposes of signature detection and identification.

References Cited by the Examiner

UNITED STATES PATENTS

| | | | |
|---|---|---|---|
| 2,527,548 | 10/1950 | Hastings | 343—9 |
| 2,600,255 | 6/1952 | McConnell | 343—7.7 |
| 2,659,076 | 11/1953 | Emslie | 343—7.7 |
| 2,911,640 | 11/1959 | Atlas | 343—11 |
| 2,968,034 | 1/1961 | Cafarelli | 343—112 |
| 3,115,627 | 12/1963 | Pierce | 343—8 |
| 3,134,100 | 5/1964 | Laktos | 343—8 |
| 3,152,327 | 10/1964 | Barker | 343—8 |
| 3,155,937 | 11/1964 | Grimm | 340—6 |
| 3,155,971 | 11/1964 | Hansel | 343—8 |
| 3,160,881 | 12/1964 | Pederzani | 343—6 |

CHESTER L. JUSTUS, *Primary Examiner.*

R. D. BENNETT, *Assistant Examiner.*